US012811228B2

(12) United States Patent
Ensling et al.

(10) Patent No.: US 12,811,228 B2
(45) Date of Patent: Nov. 24, 2026

(54) ENERGY STORAGE ELEMENT WITH COMPACT LID ASSEMBLY AND PRODUCTION METHOD

(71) Applicant: VARTA Microbattery GmbH, Ellwangen Jagst (DE)

(72) Inventors: David Ensling, Ellwangen (DE); Waldemar Frank, Ellwangen (DE); Michael Geiger, Ellwangen (DE); Edward Pytlik, Ellwangen (DE)

(73) Assignee: VARTA MICROBATTERY GMBH, Ellwangen Jagst (DE)

( * ) Notice: Subject to any disclaimer, the term of this patent is extended or adjusted under 35 U.S.C. 154(b) by 779 days.

(21) Appl. No.: 18/301,333

(22) Filed: Apr. 17, 2023

(65) Prior Publication Data

US 2023/0344048 A1 Oct. 26, 2023

(30) Foreign Application Priority Data

Apr. 22, 2022 (EP) .................................... 22169512
Jul. 4, 2022 (EP) .................................... 22182808

(51) Int. Cl.
*H01M 50/188* (2021.01)
*H01M 10/04* (2006.01)
(Continued)

(52) U.S. Cl.
CPC ....... *H01M 50/188* (2021.01); *H01M 10/049* (2013.01); *H01M 50/107* (2021.01);
(Continued)

(58) Field of Classification Search
CPC ............. H01M 50/188; H01M 50/107; H01M 50/152; H01M 50/533; H01M 50/534;
(Continued)

(56) References Cited

U.S. PATENT DOCUMENTS

2006/0019150 A1 1/2006 Rigobert et al.

FOREIGN PATENT DOCUMENTS

| | | | | |
|---|---|---|---|---|
| DE | 102017216871 A1 * | 3/2019 | .......... H01M 50/172 |
| EP | 3965196 A1 | 3/2022 | |
| JP | 2004119330 A * | 4/2004 | |
| JP | 2008311184 A * | 12/2008 | |
| JP | 2017037702 A * | 2/2017 | .......... H01M 50/325 |

(Continued)

OTHER PUBLICATIONS

DE_102017216871 English Translation (Year: 2017).*
(Continued)

*Primary Examiner* — Jimmy Vo
(74) *Attorney, Agent, or Firm* — Leydig, Voit & Mayer, Ltd.

(57) ABSTRACT

An energy storage element includes a sealed housing and an electrode-separator assembly disposed therein. The housing includes a metallic cup-shaped housing part having a housing bottom, a circumferential side wall, and a terminal opening, and a lid assembly closing the terminal opening of the cup-shaped housing part. One edge of an anode current collector or of a cathode current collector is electrically connected to the housing bottom and another edge is electrically connected to a contact sheet metal member which is directly seated on this edge. The lid assembly includes a metallic cover plate and a terminal pole which is guided through an aperture in the cover plate and is electrically insulated from the cover plate. The terminal pole is seated directly on the contact sheet metal member and is connected thereto by welding. Furthermore, the terminal pole is electrically insulated from the cover plate by a cured potting compound.

15 Claims, 11 Drawing Sheets

(51) Int. Cl.

| | |
|---|---|
| ***H01M 50/107*** | (2021.01) |
| ***H01M 50/119*** | (2021.01) |
| ***H01M 50/152*** | (2021.01) |
| ***H01M 50/159*** | (2021.01) |
| ***H01M 50/184*** | (2021.01) |
| ***H01M 50/342*** | (2021.01) |
| ***H01M 50/533*** | (2021.01) |
| ***H01M 50/534*** | (2021.01) |
| ***H01M 50/566*** | (2021.01) |

(52) U.S. Cl.
CPC ....... *H01M 50/119* (2021.01); *H01M 50/152* (2021.01); *H01M 50/159* (2021.01); *H01M 50/184* (2021.01); *H01M 50/3425* (2021.01); *H01M 50/533* (2021.01); *H01M 50/534* (2021.01); *H01M 50/566* (2021.01)

(58) Field of Classification Search
CPC ........... H01M 50/3425; H01M 50/184; H01M 50/119; H01M 50/159; H01M 50/566; H01M 10/0459
See application file for complete search history.

(56) References Cited

FOREIGN PATENT DOCUMENTS

WO WO 2017/215900 A1 12/2017
WO WO-2021239492 A1 * 12/2021 .......... H01M 50/538

OTHER PUBLICATIONS

JP_2004119330 English Translation (Year: 2004).*
JP_2008311184 English Translation (Year: 2008).*
JP_2017037702 English Translation (Year: 2017).*
WO_2021239492 English Translation (Year: 2021).*
International Electrotechnical Commission, "IEC/EN 61951-1," Feb. 2023, pp. 1-9, Switzerland.
International Electrotechnical Commission, "IEC/EN 60622," Oct. 2002, pp. 1-18, Switzerland.
International Electrotechnical Commission, "IEC/EN 61951-2," Mar. 2017, pp. 1-48, Switzerland.
International Electrotechnical Commission, "IEC/EN 61960," Feb. 2017, pp. 1-50, Switzerland.
International Electrotechnical Commission, "IEC/EN 61056-1," Feb. 2012, pp. 1-23, Switzerland.

* cited by examiner

ENERGY STORAGE ELEMENT WITH COMPACT LID ASSEMBLY AND PRODUCTION METHOD

CROSS REFERENCE TO RELATED APPLICATIONS

This application claims benefit to European Patent Application No. EP 22182808.0, filed on Jul. 4, 2022, and European Patent Application No. EP 22169512.5, filed on Apr. 22, 2022, both of which are hereby incorporated by reference herein.

FIELD

The disclosure relates to an energy storage element and a production method for producing such an energy storage element.

BACKGROUND

Electrochemical energy storage elements can convert stored chemical energy into electrical energy by virtue of a redox-reaction. The simplest form of an electrochemical energy storage element is the electrochemical cell. It comprises a positive and a negative electrode with a separator between them. During a discharge, electrons are released at the negative electrode as a result of an oxidation process. This results in an electron current that can be drawn off by an external electrical consumer, for which the electrochemical cell serves as an energy supplier. At the same time, an ion current corresponding to the electrode reaction occurs within the cell. This ion current crosses the separator and is made possible by an ion-conducting electrolyte. The separator thus prevents direct contact between the electrodes. At the same time, however, it enables electrical charge equalization between the electrodes.

If the discharge is reversible, i.e. if it is possible to reverse the conversion of chemical energy into electrical energy that took place during the discharge and to charge the cell again, this is said to be a secondary cell. The designation of the negative electrode as anode and the designation of the positive electrode as cathode, which is generally used for secondary cells, refers to the discharge function of the electrochemical cell.

Secondary lithium-ion cells are used as energy storage elements for many applications because they can provide high currents and are characterized by a comparatively high energy density. They are based on the use of lithium, which can migrate between the electrodes of the cell in the form of ions. The negative electrode and the positive electrode of a lithium-ion cell are generally formed by so-called composite electrodes, which comprise electrochemically active components as well as electrochemically inactive components.

In principle, all materials that can absorb and release lithium ions can be used as electrochemically active components (active materials) for secondary lithium-ion cells. For the negative electrode, for example, carbon-based particles such as graphitic carbon are used. Active materials for the positive electrode can be, for example, lithium cobalt oxide ($LiCoO_2$), lithium manganese oxide ($LiMn_2O_4$), lithium iron phosphate ($LiFePO_4$) or derivatives thereof. The electrochemically active materials are generally contained in particle form in the electrodes.

As electrochemically inactive components, the composite electrodes generally comprise a flat and/or strip-shaped current collector, for example a metallic foil, which serves as a carrier for the respective active material. The current collector for the negative electrode (anode current collector) can be formed of copper or nickel, for example, and the current collector for the positive electrode (cathode current collector) can be formed of aluminum, for example.

Furthermore, the electrodes can comprise an electrode binder (e.g. polyvinylidene fluoride (PVDF) or another polymer, for example carboxymethyl cellulose), conductivity enhancing additives and other additives as electrochemically inactive components. The electrode binder ensures the mechanical stability of the electrodes and often the adhesion of the active material to the current collectors.

As electrolytes, lithium-ion cells usually comprise solutions of lithium salts such as lithium hexafluorophosphate ($LiPF_6$) in organic solvents (e.g. ethers and esters of carbonic acid).

The composite electrodes are generally combined with one or more separators to form an electrode-separator assembly during the production of a lithium-ion cell. In this process, the electrodes and separators are often, but by no means necessarily, connected under pressure, possibly also by lamination or by bonding. The basic functionality of the cell can then be established by impregnating the assembly with the electrolyte.

In many embodiments, the electrode-separator assembly is formed in the form of a winding or is processed into a winding. In the first case, for example, a ribbon-shaped positive electrode and a ribbon-shaped negative electrode as well as at least one ribbon-shaped separator are fed separately to a winding machine and spirally wound therein into a winding with the sequence positive electrode/separator/negative electrode. In the second case, a ribbon-shaped positive electrode and a ribbon-shaped negative electrode as well as at least one ribbon-shaped separator are first combined to form an electrode-separator assembly, for example using the aforementioned pressure. In a further step, the assembly is then wound up.

For applications in the automotive sector, for e-bikes or also for other applications with high energy requirements, such as in tools, lithium-ion cells with the highest possible energy density are needed that are simultaneously able to be loaded with high currents during charging and discharging.

Cells for said applications are often designed as cylindrical round cells, for example with the form factor 21×70 (diameter*height in mm). Cells of this type always comprise an assembly in the form of a winding. Modern lithium-ion cells of this form factor can achieve an energy density of up to 270 Wh/kg.

WO 2017/215900 A1 describes cylindrical round cells in which the electrode-separator assembly and its electrodes are ribbon-shaped and are in the form of a winding. The electrodes each comprise current collectors loaded with electrode material. Oppositely poled electrodes are arranged offset to each other within the electrode-separator assembly so that longitudinal edges of the current collectors of the positive electrodes protrude from the winding on one side and longitudinal edges of the current collectors of the negative electrodes protrude from the winding on another side. For electrical contacting of the current collectors, the cell has a contact sheet metal member which is seated on an end face of the winding and is connected to an end face of one of the current collectors by welding. This makes it possible to electrically contact the current collector and thus also the respective electrode over its entire length. This significantly reduces the internal resistance within the cell described. The occurrence of large currents can subsequently be absorbed much better and heat can also better dissipate from the winding.

Cylindrical round cells such as those in WO 2017/215900 A1 are usually used as part of a cell group in which several cells are connected together in series and/or in parallel. It is often desirable to have to contact the cells only at one of their end faces in order to tap an electrical voltage. It is therefore advantageous to provide both a terminal connected to the positive electrode of the cell and a terminal connected to the negative electrode of the cell on only one of its end faces.

A lithium-ion round cell is known from US 2006/0019150 A1, which comprises an electrode-separator assembly formed as a winding in a cylindrical housing. The housing comprises a cylindrical metal housing cup with an opening closed by a metal lid assembly. The bottom of the housing cup is electrically connected to the positive electrode of the winding, and the housing cup is therefore positively poled. Both housing parts are in direct contact with each other, so the lid assembly is also positively poled. A positive metallic terminal pole is welded onto the lid assembly. The negative electrode of the winding, on the other hand, is connected to a negative metallic terminal pole, which is guided through an aperture in the lid assembly and is electrically insulated from the lid assembly. The positive and negative terminal poles are thus arranged next to each other on the same side of the cell, so that the cell can be easily integrated into a cell group via corresponding current conductors.

In addition to its good contactability, the cell described in US 2006/0019150 A1 also features an integrated overpressure protection. For this purpose, the bottom has a central, circular region which is separated from an annular residual region of the bottom by a circumferential weakening line and to which a bent arrester strip is welded on the inside, via which said electrical contact of the bottom to the positive electrode of the winding exists. In case of overpressure inside the housing, the circular region can be blown out of the bottom. Since an annular insulator ensures that the annular residual area has no contact whatsoever with the electrode-separator assembly formed as a winding, the electrical connection between the positive electrode and the annular residual area and all components in electrical contact therewith, including the positive terminal pole, is thereby interrupted.

The negative electrode of the winding is electrically contacted via a multiple bent arrester strip, the upper end of which is coupled to the negative terminal pole.

From an energy point of view, the design of the cell described in US 2006/0019150 A1 is not optimal. There is a dead volume at both ends of the winding, which requires the aforementioned arrester strips to bridge it. These have a negative effect on the energy density of the cell.

SUMMARY

In an embodiment, the present disclosure provides an energy storage element. The energy storage element includes an air- and liquid-tight sealed housing that includes a metallic, cup-shaped housing part that comprises a housing bottom, a circumferential side wall, and a terminal opening, and a lid assembly which closes the terminal opening of the cup-shaped housing part, the lid assembly including a metallic cover plate and a terminal pole which is passed through an aperture in the cover plate and is electrically insulated from the cover plate. The energy storage element further includes an electrode-separator assembly disposed in the housing. The electrode-separator assembly includes a first flat terminal end face and a second flat terminal end face, an anode having an anode current collector having a first edge, a second edge parallel thereto, a main region loaded with a layer of negative electrode material and a free edge strip extending along its first edge which is not loaded with the electrode material, and a cathode with a cathode current collector having a first edge, a second edge parallel thereto, a main region loaded with a layer of positive electrode material and a free edge strip extending along its first edge which is not loaded with the electrode material. The energy storage element additionally includes a contact sheet metal member directly seated on the first edge of the anode current collector or on the first edge of the cathode current collector, the contact sheet metal member being electrically connected to the terminal passing through the aperture in the cover plate. The anode and the cathode are arranged within the electrode-separator assembly such that the first edge of the anode current collector protrudes from the first terminal end face and the first edge of the cathode current collector protrudes from the second terminal end face of the electrode-separator assembly. The first edge of the cathode current collector or the anode current collector which is not in direct contact with the contact sheet metal member is electrically connected to the housing bottom. The terminal pole sits directly on the contact sheet metal member and is connected to it by welding. The terminal pole is electrically insulated from the cover plate by a cured potting compound of an electrically insulating plastic material.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
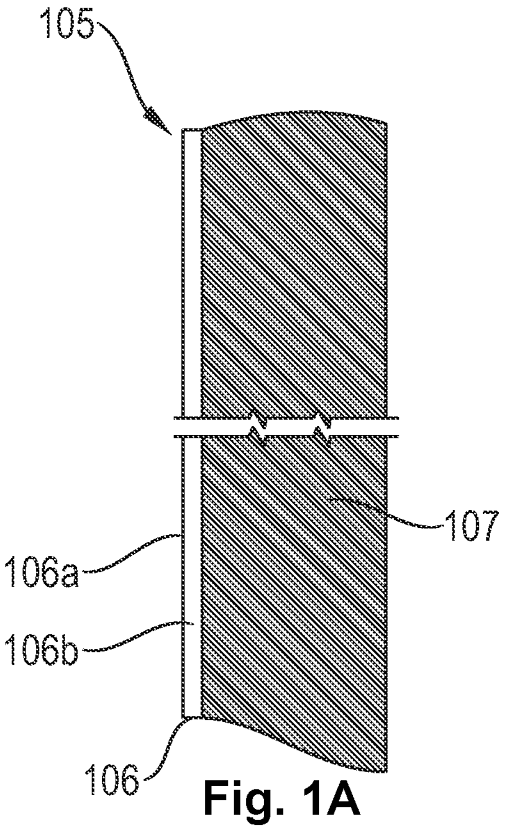
FIGS. 1A-D provide schematic illustrations of electrode ribbons and their arrangement to illustrate the structure of an electrode-separator assembly of an energy storage cell according to an embodiment.
Figure 1B:
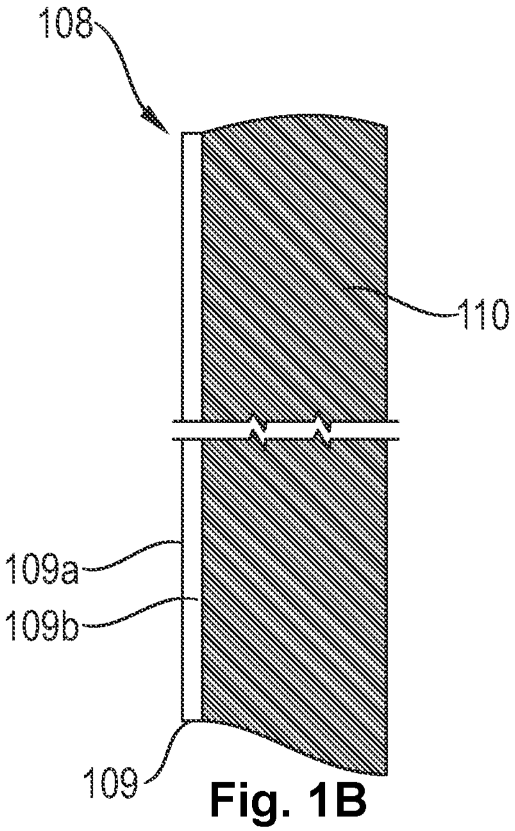
Figure 1C:
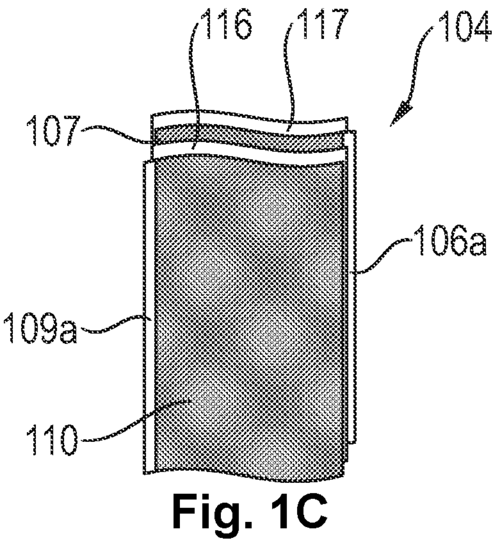

The present disclosure provides energy storage elements which are characterized by an improved energy density compared with the prior art and which can be efficiently processed to form a cell group. Furthermore, the energy storage elements also exhibit improved safety.

Energy storage element An energy storage element is provided that has the immediately following features a. to o.:

a. It comprises an air- and liquid-tight sealed housing and an electrode-separator assembly disposed therein.

b. The housing comprises a metal, cup-shaped housing part having a housing bottom, a circumferential side wall, and a terminal opening.

c. The housing comprises a lid assembly that closes the terminal opening of the cup-shaped housing part.

d. The lid assembly comprises a metallic cover plate and a terminal pole which is guided through an aperture in the cover plate and is electrically insulated from the cover plate.

e. The electrode-separator assembly comprises a first flat terminal end face and a second flat terminal end face.

f. The electrode-separator assembly comprises an anode with an anode current collector having a first edge and a second edge parallel thereto.

g. The anode current collector comprises a main region loaded with a layer of negative electrode material and a free edge strip extending along its first edge that is not loaded with the electrode material.

h. The electrode-separator assembly comprises a cathode with a cathode current collector having a first edge and a second edge parallel thereto.

i. The cathode current collector comprises a main region loaded with a layer of positive electrode material and a free edge strip extending along its first edge that is not loaded with the electrode material.

j. The anode and the cathode are arranged within the electrode-separator assembly such that the first edge of the anode current collector protrudes from the first terminal end face and the first edge of the cathode current collector protrudes from the second terminal end face of the electrode-separator assembly.

k. The energy storage element comprises a contact sheet metal member directly seated on the first edge of the anode current collector or on the first edge of the cathode current collector.

l. The contact sheet metal member is electrically connected to the terminal pole passing through the aperture in the cover plate.

m. The first edge of the cathode current collector or the anode current collector, which is not in direct contact with the contact sheet metal member, is electrically connected to the housing bottom.

n. The terminal pole sits directly on the contact sheet metal member and is connected to it by welding.

o. The terminal pole is electrically insulated from the cover plate by a cured potting compound of an electrically insulating plastic material.

A lid assembly of such a design ensures that there is essentially no dead volume between the electrode-separator assembly and the metallic cover plate. Any space between the contact sheet metal member, the terminal pole, the cover plate and, if appropriate, the O-ring-shaped insulating washer can be filled with the potting compound. A lid assembly with the above features can be built very compactly.

Furthermore, such an energy storage element has the advantage that it is possible to electrically contact both the anode and the cathode via the lid assembly.

Preferred Embodiments of the Lid Assembly

In preferred embodiments, the energy storage element has at least one of the immediately following features a. and b:

a. There is an annular gap between the cover plate and the contact sheet metal member, which is filled with the potting compound.

b. The annular gap is bounded radially outward by an O-ring-shaped insulating washer made of an electrically insulating plastic material.

Preferably, the energy storage element is characterized by a combination of both features a. and b. immediately above.

In many cases, it is preferred that the cup-shaped housing part is positively polarized and the terminal pole is a negative terminal pole. In these cases, the energy storage element is characterized by the immediately following feature a., if necessary in combination with at least one further of the immediately following features b. to e:

a. The cup-shaped housing part is electrically connected to the cathode.

b. The contact sheet metal member sits on the first edge of the anode current collector and is connected to it by welding.

c. The cup-shaped housing part consists of aluminum or aluminum alloy.

d. The cover plate consists of aluminum or aluminum alloy.

e. The contact sheet metal member is in direct contact with the terminal pole guided through the aperture in the cover plate, and is preferably connected to it by welding.

Preferably, the immediately preceding features a. to e. are realized in combination.

In this embodiment, substantial parts of the housing of the energy storage element consist of aluminum or an aluminum alloy. This has various advantages. In the event of a contact of the outside of the cell with moisture, the formation of local cells is excluded. The housing itself can serve as a positive terminal basically on all its sides. However, it is preferable for the cell to be contacted exclusively via the lid assembly, where the negative terminal pole is also located. For this purpose, a diverter can be welded directly to the cover plate or alternatively fixed to the separate terminal pole, for example by means of welding.

Suitable aluminum alloys for the cup-shaped housing part and the cover plate are, for example, Al alloys of type 1235, 1050, 1060, 1070, 3003, 5052, Mg3, Mg212 (3000 series) and GM55. AlSi, AlCuTi, AlMgSi, AlSiMg, AlSiCu, AlCuTiMg and AlMg are also suitable. The aluminum content of said alloys is preferably above 99.5%.

In further cases, it may be preferred that the cup-shaped housing part is negatively poled and the terminal pole is a positive terminal pole. In these cases, the energy storage element has the immediately following feature a., if appropriate in combination with at least one further of the immediately following features b. to e:

a. The cup-shaped housing part is electrically connected to the anode.
b. The contact sheet metal member is seated on the first edge of the cathode current collector and is connected to it by welding.
c. The cup-shaped housing part consists of copper or nickel or copper or nickel alloy or steel or nickel-plated steel.
d. The cover plate consists of copper or nickel or copper or nickel alloy or steel or nickel-plated steel.
e. The contact sheet metal member is in direct contact with the terminal pole guided through the aperture in the cover plate, and is preferably connected to it by welding.

Preferably, the immediately preceding features a. to e. are realized in combination.

In this embodiment, substantial parts of the housing of the energy storage element consist of copper or nickel or a copper or nickel alloy or steel or nickel-plated steel.

Suitable stainless steels are, for example, stainless steels of type 1.4303 or 1.4404 or of type SUS304 or nickel-plated steels. In particular, materials of type EN CW-004A or EN CW-008A with a copper content of at least 99.9% can be used as copper alloy. Nickel alloys of the type NiFe, NiCu, CuNi, NiCr and NiCrFe are particularly suitable.

In a development of an energy storage element, in which the cup-shaped housing part has positive polarity and the terminal pole is a negative terminal pole, the energy storage element is characterized by the immediately following features a. to d.:

a. The contact sheet metal member consists of nickel or copper or titanium or nickel or copper or titanium alloy or stainless steel.
b. The terminal pole is a bimetallic terminal pole and comprises a pole base part made of nickel or copper or titanium or a nickel or copper or titanium alloy or stainless steel and a pole top part made of aluminum or an aluminum alloy.
c. The pole base part is welded to the contact sheet metal member.
d. The pole base part and contact sheet metal member and anode current collector consist of the same material.

Preferably, the energy storage element is characterized by a combination of all immediately preceding features a. to d.

Thus, in this embodiment, the energy storage element is characterized by a terminal pole comprising two different metallic materials, nickel or copper or titanium or the nickel or copper or titanium alloy or stainless steel on one side and aluminum or the aluminum alloy on the other side.

It is thus possible to build energy storage elements whose housing outer surface is formed entirely from aluminum or an aluminum alloy.

The pole top part is accessible from the outside and can be welded to an aluminum current conductor, for example. Such energy storage elements offer the significant advantage that they can be easily integrated into a cell group. In this case, poles of several energy storage elements are interconnected via a common current conductor. In terms of production technology, it can be advantageous to weld the poles of the cells to the current conductor by means of a laser. This is generally unproblematic only if the materials to be welded are the same. For example, welding a terminal pole made of copper to a current conductor made of aluminum using a laser is difficult or impossible. With the pole upper part made of aluminum or aluminum alloy, on the other hand, this is possible without any problems. Thus, even negative terminal poles of a cell can be connected by laser via a common current conductor made of aluminum.

Suitable aluminum alloys are, for example, Al alloys of type 1235, 1050, 1060, 1070, 3003, 5052, Mg3, Mg212 (3000 series) and GM55. AlSi, AlCuTi, AlMgSi, AlSiMg, AlSiCu, AlCuTiMg and AlMg are also suitable. The aluminum content of said alloys is preferably above 99.5%. Suitable stainless steels are, for example, stainless steels of type 1.4303 or 1.4404 or of type SUS304 or nickel-plated steels. In particular, materials of type EN CW-004A or EN CW-008A with a copper content of at least 99.9% can be used as copper alloys. Nickel alloys of the type NiFe, NiCu, CuNi, NiCr and NiCrFe are particularly suitable.

In a further development of an energy storage element, in which the cup-shaped housing part has negative polarity and the terminal pole is a positive terminal pole, the energy storage element has the immediately following features a. to c:

a. The contact sheet metal member consists of aluminum or aluminum alloy.
b. The terminal pole consists of aluminum or aluminum alloy.
c. The contact sheet metal member and the terminal pole and cathode current collector consist of the same material.

Preferably, the energy storage element is characterized by a combination of all the features a. to c. immediately above.

In this embodiment, it is thus also possible to build energy storage elements whose housing outer surface is formed entirely from aluminum or from an aluminum alloy.

Preferred Embodiments of the Contact Sheet Metal Member/Connection of the Contact Sheet Metal Member to the Anode Current Collector and the Negative Terminal or to the Cathode Current Collector and the Positive Terminal The contact sheet metal member is electrically connected to the terminal pole passing through the aperture in the cover plate and to either the anode current collector or the cathode current collector. In particular, it is welded directly to the terminal pole and/or the respective current collector.

In a preferred embodiment, in which the cup-shaped housing part has positive polarity and the terminal pole is a negative terminal pole, the contact sheet metal member electrically connected to the negative terminal pole has at least one of the immediately following features:

a. The contact sheet metal member consists of nickel or copper or titanium or a nickel or copper or titanium alloy or stainless steel, for example, type 1.4303 or 1.4404 or type SUS304, or nickel-plated copper.
b. The contact sheet metal member consists of the same material as the negative terminal pole or as the pole base part of the negative terminal pole.
c. The contact sheet metal member consists of the same material as the anode current collector.

It is preferred that the immediately preceding features a. and b., preferably also features a. to c., are realized in combination with each other.

In a preferred embodiment, in which the cup-shaped housing part has negative polarity and the terminal pole is a positive terminal pole, the contact sheet metal member electrically connected to the positive terminal pole has at least one of the immediately following features a. to c.:

a. The contact sheet metal member consists of aluminum or aluminum alloy.

b. The contact sheet metal member consists of the same material as the positive terminal.
c. The contact sheet metal member consists of the same material as the cathode current collector.

It is preferred that the immediately preceding features a. and b., preferably also features a. to c., are realized in combination with each other.

If the contact sheet metal member consists of the same material as the positive terminal and/or the cathode current collector, welding of these components is possible without any problems.

Suitable aluminum alloys for the contact sheet metal member include Al alloys of types 1235, 1050, 1060, 1070, 3003, 5052, Mg3, Mg212 (3000 series) and GM55. AlSi, AlCuTi, AlMgSi, AlSiMg, AlSiCu, AlCuTiMg and AlMg are also suitable. The aluminum content of said alloys is preferably above 99.5%.

In possible preferred developments, the contact sheet metal member has at least one of the immediately following features a. to f.:

a. The contact sheet metal member has a preferably uniform thickness in the area from 50 μm to 600 μm, preferably in the region from 150 μm to 350 μm.
b. The contact sheet metal member has two opposing flat sides and extends substantially in only one dimension.
c. The contact sheet metal member is a disc or polygonal plate.
d. The contact sheet metal member is dimensioned such that it covers at least 40%, preferably at least 60%, preferably at least 80%, of the end face from which the edge of the current collector on which it rests protrudes.
e. The contact sheet metal member has at least one bead which appears as an elongated depression on one flat side of the contact sheet metal member and as an elongated elevation on the opposite flat side, wherein the contact sheet metal member rests with the flat side which carries the elongated elevation on the first edge of the anode current collector or on the first edge of the cathode current collector.
f. The contact sheet metal member is welded to the first edge of the anode current collector or the first edge of the cathode current collector in the region from the bead.

It is preferred that the immediately preceding features a. to c., especially preferably the immediately preceding features a. to d., are realized in combination with each other. In a preferred embodiment, the features a. to d. are realized in combination with the features e. and f.

Covering the end face over as large an area as possible is important for the thermal management of the energy storage element. The larger the cover, the more likely it is to contact the first edge of the respective current collector over its entire length, if possible. Heat formed in the electrode-separator assembly can thus be dissipated well via the contact sheet metal member.

In some embodiments, it has proved advantageous to subject the edge of the respective current collector on which the contact sheet metal member is placed to a pretreatment before placing the contact sheet metal member. In particular, at least one depression can also be folded into the edge here, which corresponds to the at least one bead or the elongated elevation on the flat side of the contact sheet metal member facing the first terminal end face.

The edge of the current collector may also have been subjected to directional forming by pretreatment. For example, it can be bent in a defined direction.

In some preferred embodiments, the contact sheet metal member is pressed into the end face of the winding. In this case, the at least one bead is not required. In these cases, the contact sheet metal member is preferably polygonal or strip-shaped and preferably covers at least 40%, preferably at least 60%, especially at least 80%, of the end face into which it is pressed.

Primary and Secondary Protection

In a preferred embodiment, the energy storage element is characterized by the following features a. and b.:

a. The housing bottom of the cup-shaped housing part has a primary protection against internal overpressure in the form of an aperture which is closed by means of a metallic membrane.
b. The housing bottom of the cup-shaped housing part has a secondary protection against internal overpressure in the form of at least one groove on its inner side or its outer side.

The primary fuse has the function of bringing about controlled pressure compensation when an impermissible overpressure occurs above a defined threshold. In this case, the membrane is ruptured or blown off by the pressure, and gas formed inside the housing can escape through the aperture in the housing bottom.

The secondary fuse is provided for cases where pressure equalization via the primary fuse is not fast enough. In this case, due to the excess pressure along the groove, which is nothing more than a weakening of the structure of the housing bottom, the housing bottom can tear open, creating an exit opening with a comparatively large cross-section through which gas formed inside the housing can escape.

Such protection solutions are already known per se. By suitable design of the groove and the membrane, it is possible to precisely set at which pressure the protections are triggered.

Since these safety functions are not integrated in the lid assembly—as is the case with many conventional cells—but instead in the housing bottom, it is possible to build the lid assembly extremely compact. A pre-assembly of the lid assembly is also not necessary. Instead, the lid assembly can be manufactured during assembly of the housing, as described in more detail below.

In preferred embodiments, the energy storage element has at least one of the immediately following features a. to e:

a. The cover plate is welded into the terminal opening of the cup-shaped housing part.
b. The contact sheet metal member is assembled to the first edge of the anode current collector or the first edge of the cathode current collector by welding.
c. The first edge of the anode current collector or the cathode current collector, which is not in direct contact with the contact sheet metal member, is seated directly on the housing bottom.
d. The first edge of the anode current collector or the cathode current collector, which is not in direct contact with the contact sheet metal member, is connected to the housing bottom by welding.
e. The at least one groove is found on the inside of the housing bottom.

Preferably, the immediately preceding features a. to d. are realized in combination, especially preferably the immediately preceding features a. to e.

In another preferred embodiment, the energy storage element is characterized by the following feature a:

a. The metallic membrane is fixed to the bottom of the cup-shaped housing part by welding.

The bottom of the cup-shaped housing part may have a shallow depression into which the membrane is inserted so that it does not stand up. Preferably, it is connected to the bottom via a circular weld seam that is routed around the aperture in the bottom.

The thickness of the membrane can be adjusted to the pressure at which the protection is to trip.

Preferred Designs of the Housing Bottom

In preferred embodiments, the energy storage element has at least one of the immediately following features a. to f:

a. The housing bottom has at least one bead which appears on its outside as an elongated depression and on its inside as an elongated elevation, with the first edge of the anode current collector or the first edge of the cathode current collector resting on the inside.
b. The housing bottom is welded to the first edge of the anode current collector or the first edge of the cathode current collector in the region from the bead.
c. The aperture is positioned in the center of the housing bottom.
d. The at least one bead comprises a plurality of linear beads, in particular three beads, arranged in a star configuration around the aperture.
e. The at least one groove comprises a plurality of linear partial sections arranged in a star configuration around the aperture.
f. The at least one groove comprises a partial section extending around the aperture and interconnecting the star-shaped linear partial sections.

Preferably, the immediately preceding features a. and b., c. and d., and c. and e. and f. are realized in combination. Preferably, the immediately preceding features a. to f. are realized in combination As a result of the welding in the region of the bead, one or more weld seams are preferably found in the latter. The star-shaped beads and the star-shaped linear partial sections of the groove each preferably enclose an angle of 120°.

In some embodiments, it has proven advantageous to subject the edge of the current collector, which rests on the inside of the housing bottom, to a pretreatment in order to improve the contact between the housing bottom and the current collector. In particular, at least one depression corresponding to the at least one bead or elongated elevation on the inside of the housing bottom can be folded into the edge.

The edge of the current collector may also have been subjected to directional forming by pretreatment. For example, it can be bent in a defined direction.

In some embodiments, the bottom of the cup-shaped housing part is welded in, so it was manufactured separately and joined to the side wall by welding. In most cases, however, the cup-shaped housing part is manufactured by deep drawing.

Prismatic Embodiment

Preferably, the energy storage element is designed as a cylindrical round cell or a button cell. In some preferred embodiments, however, it can also be prismatic.

In the latter case, the housing is prismatic. In this embodiment, the bottom of the cup-shaped housing part and the lid assembly preferably have a polygonal, preferably a rectangular base. The shape of the terminal opening of the cup-shaped housing part corresponds to the shape of the bottom and the lid assembly. Furthermore, the housing comprises a plurality of, preferably four, rectangular side portions connecting the bottom and the lid assembly.

In this embodiment, the electrode-separator assembly is preferably also prismatic. In this case, the electrode-separator assembly is preferably a prismatic stack of several anodes, cathodes and at least one separator, whereby the electrode-separator assembly within the stack always comprises the sequence anode/separator/cathode.

At least the anodes and cathodes preferably have a rectangular base surface, the current collectors of the anodes and the cathodes each having the first edge and the second edge parallel thereto and each having along its first edge the free edge strip which is not coated with the respective electrode material.

In the case of multiple separators between the anodes and cathodes, the separators preferably also have a rectangular footprint. However, it is also possible that a ribbon-shaped separator is used to separate several anodes and cathodes within the stack.

For example, the first and second flat terminal end faces of the stack are two opposite or adjacent sides of the stack. The first edges of the anode current collectors protrude from one of these end faces, and the first edges of the cathode current collectors protrude from the other. The contact sheet metal member sits on the first edges of the anode current collectors and is connected to them by welding.

Design as Cylindrical Round Cell or Button Cell

In embodiments of the energy storage element as a cylindrical round cell or as a button cell, it preferably has at least one of the immediately following features a. to p.:

a. The terminal opening of the cup-shaped housing part is circular in shape and the circumferential side wall of the cup-shaped housing part comprises or forms a cylindrical housing shell.
b. The lid assembly that closes the circular opening of the cup-shaped housing part has a circular circumference.
c. The electrode-separator assembly is in the form of a cylindrical winding which, in addition to the first and second flat terminal end faces, has a winding shell located between the end faces.
d. In the housing, the electrode-separator assembly is axially aligned so that the winding shell abuts the inside of the cylindrical housing shell.
e. The anode and anode current collector are ribbon-shaped, with the anode current collector comprising a first longitudinal edge and a second longitudinal edge and two ends.
f. The first and the parallel second edge of the anode current collector are the longitudinal edges of the ribbon-shaped anode current collector.
g. The strip-shaped main region of the anode current collector is loaded with a layer of negative electrode material.
h. The free edge strip extends along the first longitudinal edge of the anode current collector.
i. The cathode and cathode current collector are ribbon-shaped, with the cathode current collector comprising a first longitudinal edge and a second longitudinal edge and two ends.
j. The first and the parallel second edges of the cathode current collector are the longitudinal edges of the ribbon-shaped cathode current collector.
k. The strip-shaped main region of the cathode current collector is loaded with a layer of positive electrode material.
l. The free edge strip extends along the first longitudinal edge of the cathode current collector.
m. The separator or separators of the electrode-separator assembly are ribbon-shaped.
n. The anode and the cathode are arranged within the electrode-separator assembly such that the first longitudinal edge of the anode current collector protrudes from the first terminal end face and the first longitudinal edge of the cathode current collector protrudes from the second terminal end face of the electrode-separator assembly.

o. The contact sheet metal member is seated on the first longitudinal edge of the anode current collector or on the first edge of the cathode current collector and is assembled to it by welding.

p. The first longitudinal edge of the anode current collector or the cathode current collector, which is not in direct contact with the contact sheet metal member, is electrically connected to the housing bottom.

Preferably, the energy storage element is characterized by a combination of all the features a. to p. immediately above.

In this embodiment, the electrode-separator assembly preferably comprises one ribbon-shaped separator or two ribbon-shaped separators, each having a first and a second longitudinal edge and two ends. The electrode-separator assembly always comprises the electrodes and the separator (s) with the sequence anode/separator/cathode.

Preferably, in this embodiment, the lid assembly with the circular periphery is arranged in the circular opening of the cup-shaped housing part in such a way that its edge abuts the inside of the cup-shaped housing part along a circumferential contact zone, the edge of the lid assembly being connected to the cup-shaped housing part by a circumferential weld seam.

Preferably, the height of energy storage elements designed as cylindrical round cells is in the region from 50 mm to 150 mm. The diameter of the cylindrical round cells is preferably in the region from 15 mm to 60 mm. Cylindrical round cells with these form factors are particularly suitable for supplying power to electric drives in motor vehicles.

If the energy storage element is designed as a button cell, it preferably has a diameter of up to 25 mm and a height of up to 15 mm.

In embodiments in which the cell is a cylindrical round cell, the anode current collector, the cathode current collector, and the separator or separators preferably have the following dimensions:

A length in the region from 0.5 m to 25 m

A width in the region from 30 mm to 145 mm

In these cases, the free edge strip which extends along the first longitudinal edge and which is not loaded with the electrode material preferably has a width of no more than 5000 μm. Preferably, the anode current collector has a free edge strip having a width in the region from 1000 to 2000 μm, especially preferably from about 1500 μm. Preferably, the cathode current collector has a free edge strip which has a width in the region from 2000 to 4000 μm, preferably from about 3000 μm.

Preferred Embodiments Of The Separator

Preferably, the separator or separators are formed from electrically insulating plastic films. It is preferred that the separators can be penetrated by the electrolyte. For this purpose, the plastic films used may have micropores, for example. The foil can consist of a polyolefin or a polyetherketone, for example. Nonwovens and fabrics made of plastic materials or other electrically insulating sheet structures can also be used as separators. Preferably, separators are used that have a thickness in the region from 5 μm to 50 μm.

In some preferred embodiments, separators are used that are coated or impregnated with ceramic particles (e.g., $Al_2O_3$ or $SiO_2$) on one or both sides.

In particular in the prismatic embodiments of the energy storage element, the separator or separators of the assembly may also be one or more layers of a solid electrolyte.

Preferred Structure of an Electrode-Separator Assembly Formed as a Winding

The ribbon-shaped anode, the ribbon-shaped cathode and the ribbon-shaped separator(s) are preferably wound spirally in the electrode-separator assembly in the form of a winding. To produce the electrode-separator assembly, the ribbon-shaped electrodes together with the ribbon-shaped separator (s) are preferably fed to a winding device and wound up in the latter, preferably spirally around a winding axis. In some embodiments, the electrodes and the separator are wound for this purpose onto a cylindrical or hollow-cylindrical winding core, which is seated on a winding mandrel and remains in the winding after winding.

The winding shell can be formed by a plastic film or an adhesive tape, for example. It is also possible that the winding shell is formed by one or more separator windings.

Preferred Electrochemical Embodiment

In another preferred embodiment, the energy storage element has the immediately following features a. and b:

a. The energy storage element is a lithium-ion cell.

b. The energy storage element comprises a lithium-ion cell.

Feature a. refers in particular to the described embodiment of the energy storage element as a cylindrical round cell or button cell. In this embodiment, the energy storage element preferably comprises or is precisely one electrochemical cell.

Feature b. refers in particular to the described prismatic embodiment of the energy storage element. In this embodiment, the energy storage element may also comprise more than one electrochemical cell.

Basically all electrode materials known for secondary lithium-ion cells can be used for the electrodes of the energy storage element.

Carbon-based particles such as graphitic carbon or non-graphitic carbon materials capable of intercalating lithium, preferably also in particle form, can be used as active materials in the negative electrodes. Alternatively or additionally, lithium titanate ($Li_4Ti_5O_{12}$) or a derivative thereof may be included in the negative electrode, preferably also in particulate form. Furthermore, the negative electrode may contain as active material at least one material from the group comprising silicon, aluminum, tin, antimony, or a compound or alloy of these materials that is capable of reversibly depositing and removing lithium, for example silicon oxide (in particular SiO, with $0<x<2$), optionally in combination with carbon-based active materials. Tin, aluminum, antimony, and silicon can form intermetallic phases with lithium. The capacity to absorb lithium exceeds that of graphite or comparable materials many times over, especially in the case of silicon. Mixtures of silicon and carbon-based storage materials are often used. Thin anodes made of metallic lithium are also suitable.

Suitable active materials for the positive electrodes include lithium metal oxide compounds and lithium metal phosphate compounds such as $LiCoO_2$ and $LiFePO_4$. Furthermore, lithium nickel manganese cobalt oxide (NMC) with the chemical formula $LiNi_xMn_yCo_zO_2$ (where x+y+z is typically 1) is particularly well suited, Lithium manganese spinel (LMO) with the chemical formula $LiMn_2O_4$, or lithium nickel cobalt alumina (NCA) with the chemical formula $LiNi_xCo_yAl_zO_2$ (where x+y+z is typically 1). Derivatives thereof, for example lithium nickel manganese cobalt alumina (NMCA) with the chemical formula $L_{1.11}(Ni_{0.40}Mn_{0.39}Co_{0.16}Al_{0.05})_{0.89}O_2$ or $Li_{1+x}$M-O compounds and/or mixtures of said materials can also be used. The cathodic active materials are also preferably used in particulate form.

In addition, the electrodes of an energy storage element preferably contain an electrode binder and/or an additive to improve electrical conductivity. The active materials are preferably embedded in a matrix of the electrode binder, with adjacent particles in the matrix preferably being in direct contact with each other. Conducting agents have the function of elevating the electrical conductivity of the electrodes. Common electrode binders are based, for example, on polyvinylidene fluoride (PVDF), (Li-)polyacrylate, styrene-butadiene rubber or carboxymethyl cellulose, or mixtures of different binders. Common conductive agents are carbon black, fine graphites, carbon fibers, carbon nanotubes and metal powders.

The energy storage element preferably comprises an electrolyte, in the case of a lithium-ion cell in particular an electrolyte based on at least one lithium salt such as lithium hexafluorophosphate ($LiPF_6$) dissolved in an organic solvent (e.g. in a mixture of organic carbonates or a cyclic ether such as THF or a nitrile). Other lithium salts that can be used include lithium tetrafluoroborate ($LiBF_4$), lithium bis(trifluoromethanesulfonyl)imide (LiTFSI), lithium bis(fluorosulfonyl)imide (LiFSI), and lithium bis(oxalato)borate (LiBOB).

The nominal capacity of a lithium-ion-based energy storage element designed as a cylindrical round cell is preferably up to 15000 mAh. With the form factor of 21×70, the energy storage element in one embodiment as a lithium-ion cell preferably has a nominal capacity in the region from 1500 mAh to 7000 mAh, preferably in the region from 3000 to 5500 mAh. With the form factor of 18×65, the cell in one embodiment as a lithium-ion cell preferably has a nominal capacity in the region from 1000 mAh to 5000 mAh, preferably in the region from 2000 to 4000 mAh.

In the European Union, manufacturers are strictly regulated in providing information on the nominal capacities of secondary batteries. For example, information on the nominal capacity of secondary nickel-cadmium batteries must be based on measurements according to the IEC/EN 61951-1 and IEC/EN 60622 standards, information on the nominal capacity of secondary nickel-metal hydride batteries must be based on measurements according to the IEC/EN 61951-2 standard, information on the nominal capacity of secondary lithium batteries must be based on measurements according to the IEC/EN 61960 standard, and information on the nominal capacity of secondary lead-acid batteries must be based on measurements according to the IEC/EN 61056-1 standard. Any information on nominal capacities in the present application is preferably also based on these standards.

Sodium Ion Based Embodiment

In further embodiments, the energy storage element may also be a sodium ion cell, a potassium ion cell, a calcium ion cell, a magnesium ion cell or an aluminum ion cell. Among these variants, energy storage cells with sodium-ion cell chemistry are preferred.

Preferably, the sodium ion-based energy storage element comprises an electrolyte comprising at least one of the following solvents and at least one of the following conducting salts:

Suitable solvents include, in particular, organic carbonates, ethers, nitriles and mixtures thereof. Preferred examples are:

Carbonates: Propylene carbonate (PC), ethylene carbonate-propylene carbonate (EC-PC), propylene carbonate-dimethyl carbonate-ethyl methyl carbonate (PC-DMC-EMC), ethylene carbonate-diethyl carbonate (EC-DEC), ethylene carbonate dimethyl carbonate (EC-DMC), ethylene carbonate ethyl methyl carbonate (EC-EMC), ethylene carbonate dimethyl carbonate ethyl methyl carbonate (EC-DMC-EMC), ethylene carbonate dimethyl carbonate diethyl carbonate (EC-DMC-DEC).

Ethers: tetrahydrofuran (THE), 2-methyltetrahydrofuran, dimethyl ether (OME), 1,4-dioxane (DX), 1,3-dioxolane (DOL), diethylene glycol dimethyl ether (DEGDME), tetraethylenglycol dimethyl ether (TEGDME).

Nitriles: Acetonitrile (ACN), Adiponitrile (AON), y-Butyrolactone (GBL)

Furthermore, trimethyl phosphate (TMP) and tris(2,2,2-trifluoroethyl) phosphate (TFP) are also possible.

Preferred conducting salts are:

$NaPF_6$, sodium difluoro(oxalato)borate (NaBOB), $NaBF_4$, sodium bis(fluorosulfonyl)imide (NaFSI), sodium 2-trifluoromethyl-4,5-dicyanoimidazole (NaTDI), sodium bis(trifluoromethanesulfonyl)imide (NaTFSI), $NaAsF_6$, $NaBF_4$, $NaClO_4$, $NaB(C_2O_4)_2$, $NaP(C_6H_4O_2)_3$; $NaCF_3SO_3$, sodium triflate (NaTf) and $Et_4NBF_4$.

In preferred embodiments, additives may be added to the electrolyte. Examples of preferred additives, especially for stabilization, are the following:

Fluoroethylene carbonate (FEC), transdifluoroethylene carbonate (DFEC), ethylene sulfite (ES), vinylene carbonate (VC), bis(2,2,2-trifluoroethyl)ether (BTFE), sodium 2-trifluoromethyl-4,5-dicyanoimidazole (NaTDI), Sodium bis (fluorosulfonyl)imide (NaFSI), aluminum chloride ($AlCl_3$), ethylene sulfate (DTD), sodium difluorophosphate ($NaPO_2F_2$), sodium difluoro(oxalato)borate (NaODFB), sodium difluorobisoxalatophosphate (NaDFOP), and tris (trimethylsilyl)borate (TMSB).

The negative electrode material of a sodium ion-based energy storage element is preferably at least one of the following materials:

- Carbon, especially preferred hard carbon (pure or with nitrogen and/or phosphorus doping) or soft carbon or graphene-based materials (with N-doping); carbon nanotubes, graphite
- Phosphorus or sulfur (conversion anode)
- Polyanions: $Na_2Ti_3O_7$, $Na_3Ti_2(PO_4)_3$, $TiP_2O_7$, $TiNb_2O_7$, Na—Ti—$(PO_4)_3$, Na—V—$(PO_4)_3$
- Prussian Blue: Na-poor variant (for systems with aqueous electrolyte)
- Transition metal oxides: $V_2O_5$, $MnO_2$, $TiO_2$, $Nb_2O_5$, $Fe_2O_3$, $Na_2Ti_3O_7$, $NaCrTiO_4$, $Na_4Ti_5O_{12}$
- MXenes with M=Ti, V, Cr, Mo or Nb and A=Al, Si, and Ga as well as X═C and/or N, e.g. $Ti_3C_2$
- Organic: e.g. Na terephthalates ($Na_2C_8H_2O_4$)

Alternatively, a Na metal anode can also be used on the anode side.

The positive electrode material of a sodium ion-based energy storage element may for example be at least one of the following materials:

- Polyanions: $NaFePO_4$ (Triphylit type), $Na_2Fe(P_2O_7)$, $Na_4Fe_3(PO_4)_2(P_2O_7)$, $Na_2FePO_4F$, $Na/Na_2[Fe_{1/2}Mn_{1/2}]PO_4F$, $Na_3V_2(PO_4)_2F_3$, $Na_3V_2(PO_4)_3$, $Na_4(CoMnNi)_3(PO_4)_2P_2O_7$, $NaCoPO_4$, $Na_2CoPO_4F$
- Silicates: $Na_2MnSiO_4$, $Na_2FeSiO_4$
- Layered oxides: $NaCoO_2$, $NaFeO_2$, $NaNiO_2$, $NaCrO_2$, $NaVO_2$, $NaTiO_2$, $Na(FeCo)O_2$, $Na(NiFeCo)_3O_2$, $Na(NiFeMn)O_2$, and $Na(NiFeCoMn)O_2$, $Na(NiMnCo)O_2$ $NaCoO_2$, $NaFeO_2$, $NaNiO_2$, $NaCrO_2$, $NaVO_2$, $NaTiO_2$, $Na(FeCo)O_2$, $Na(NiFeCo)_3O_2$, $Na(NiFeMn)O_2$, and $Na(NiFeCoMn)O_2$, $Na(NiMnCo)O_2$ In addition, the electrodes of an energy storage element preferably contain an electrode binder and/or an additive for improving electrical conductivity. The active materials are preferably embedded in a matrix of the electrode binder, wherein the active materials are preferably used in particulate form and adjacent particles in the matrix are preferably in direct contact with one another. Conducting agents have the function of elevating the electrical conductivity of the electrodes. Common electrode binders are based, for example, on polyvinylidene fluoride (PVDF), (Na-)polyacrylate, styrene-butadiene rubber, (Na-)alginate or carboxymethyl cellulose, or mixtures of different binders. Common conductive agents are carbon black, fine graphites, carbon fibers, carbon nanotubes and metal powders.

Preferably, in an energy storage element based on sodium ion technology, both the anode and the cathode current collector consist of aluminum or an aluminum alloy. The housing and the contact plates, as well as any further current conductors present within the housing, can also consist of aluminum or the aluminum alloy.

Preferred Embodiments of the Current Collectors

The current collectors of the energy storage element have the function of electrically contacting electrochemically active components contained in the respective electrode material over as large an area as possible. Preferably, the current collectors consist of a metal or are at least metallized on the surface.

In the case of an energy storage element designed as a lithium-ion cell, suitable metals for the anode current collector are, for example, copper or nickel or other electrically conductive materials, in particular copper and nickel alloys or metals coated with nickel. In particular, materials of the type EN CW-004A or EN CW-008A with a copper content of at least 99.9% can be used as copper alloys. Nickel alloys of the type NiFe, NiCu, CuNi, NiCr and NiCrFe are particularly suitable. Nickel alloys of the type NiFe, NiCu, CuNi, NiCr and NiCrFe are particularly suitable. Stainless steel is also possible in principle, for example type 1.4303 or 1.4404 or type SUS304.

In the case of an energy storage element designed as a lithium-ion cell, aluminum or other electrically conductive materials, including aluminum alloys, are particularly suitable as the metal for the cathode current collector.

Suitable aluminum alloys for the cathode current collector include Al alloys of types 1235, 1050, 1060, 1070, 3003, 5052, Mg3, Mg212 (3000 series) and GM55. AlSi, AlCuTi, AlMgSi, AlSiMg, AlSiCu, AlCuTiMg and AlMg are also suitable. The aluminum content of said alloys is preferably above 99.5%.

Preferably, the anode current collector and/or the cathode current collector are each a metal foil with a thickness in the region from 4 μm to 30 μm, and in the case of the described configuration of the energy storage element as a cylindrical round cell, a ribbon-shaped metal foil with a thickness in the region from 4 μm to 30 μm.

In some preferred embodiments, the foils may be perforated.

In addition to foils, however, other ribbon-shaped substrates such as metallic or metallized nonwovens or open-pore metallic foams or expanded metals can be used as current collectors.

The current collectors are preferably loaded on both sides with the respective electrode material.

In the case of the described configuration of the energy storage element as a cylindrical round cell, it is preferred that the longitudinal edges of the separator(s) form the end faces of the electrode-separator assembly formed as a winding.

In the case of the prismatic configuration of the energy storage element described, it is preferred that the edges of the separator(s) form the end faces of the stack from which the edges of the current collectors emerge.

It is further preferred that the longitudinal edges or margins of the anode current collector and/or the cathode current collector protruding from the terminal faces of the winding or sides of the stack do not exceed 5000 μm, preferably not exceed 3500 μm.

Preferably, the edge or longitudinal edge of the anode current collector protrudes from the side of the stack or the end face of the winding no more than 2500 μm, especially preferably no more than 1500 μm. Preferably, the edge or longitudinal edge of the cathode current collector protrudes from the side of the stack or the end face of the winding no more than 3500 μm, especially preferably no more than 2500 μm.

Preferred Embodiment Of The Housing Parts

In a further preferred embodiment, the energy storage element has at least one of the immediately following features a. to c.:

a. The bottom of the cup-shaped housing part has a thickness in the region from 200 μm to 2000 μm.
b. The side wall of the cup-shaped housing part has a thickness in the region from 150 μm to 2000 μm.
c. The lid assembly, in particular the cover plate of the lid assembly, has a thickness in the region from 200 μm to 2000 μm.

Preferably, the immediately preceding features a. to c. are realized in combination.

Method

A method for production used to produce an energy storage element described herein is characterized by the following steps a. to e.:

a. Provision of a metal cup-shaped housing part comprising a housing bottom, a circumferential side wall, and a terminal opening,
b. Provision of an electrode-separator assembly comprising
   - a cathode having a cathode current collector having a first edge and a second edge parallel thereto,
   - an anode comprising an anode current collector having a first edge and a second edge parallel thereto, and
   - a first flat terminal end face and a second flat terminal end face wherein
   - the anode current collector comprises a main region loaded with a layer of negative electrode material and a free edge strip which extends along its first edge and which is not loaded with the electrode material, wherein
the cathode current collector comprises a main region loaded with a layer of positive electrode material and a free edge strip extending along its first edge which is not loaded with the electrode material, wherein
   - the anode and the cathode are arranged within the electrode-separator assembly in such a way that the first edge of the anode current collector protrudes from the first terminal end face and the first edge of the cathode current collector protrudes from the second terminal end face of the electrode-separator assembly, c. Insert the electrode-separator assembly into the cup-shaped housing part so that the first edge of the anode current collector or the first edge of the cathode current collector rests on the housing bottom.

d. A cover plate, which has an aperture for the terminal pole (102*b*), is inserted into the terminal opening of the cup-shaped housing part (101).

e. A gap remaining between the cover plate (102*a*) and the contact sheet metal member (111) is filled with a potting compound (113) which, when cured, electrically insulates the cover plate (102*a*) from the terminal pole (102*b*) and from the contact sheet metal member (111).

The components used in the method have all been described in connection with the energy storage element. Reference is hereby made to the corresponding explanations.

With steps d. and e., the housing of the energy storage element is formed and simultaneously sealed at its top. It is preferred that the cover plate be welded to the cup-shaped housing part before step e. This measure, in combination with the application of the potting compound in step e., ensures the liquid- and gas-tight sealing of the housing.

As stated above, it is preferred that either the first edge of the anode current collector or the first edge of the cathode current collector is seated directly on the housing bottom. Furthermore, it is preferred that the edge sitting on the housing bottom is fixed to the housing bottom by welding.

The welded connection between the first edge, which rests on the housing bottom, and the housing bottom is preferably made by welding, in particular laser welding, from the outside.

In preferred embodiments, the method comprises at least one of the immediately following steps a. and b.:

a. A contact sheet metal member is positioned on the first edge of the anode current collector or the first edge of the cathode current collector that is not seated on the housing bottom, and is fixed to this edge by welding.

b. A terminal pole is fixed on the contact sheet metal member.

Preferably, the method comprises both steps a. and b.

Step a. as well as step b. can be carried out before or after inserting the electrode-separator assembly into the housing cup. The terminal pole is fixed to the contact sheet metal member by welding.

In preferred embodiments, the O-ring-shaped insulating washer made of an electrically insulating plastic material mentioned above is placed on the contact sheet metal member before the cover plate is inserted. It delimits the gap to be filled with potting compound radially outwards.

The electrode-separator assembly can be impregnated with a suitable electrolyte via the aperture in the housing bottom of the metal, cup-shaped housing part. The aperture can then be sealed by means of the metallic membrane.

In preferred embodiments, the method comprises the immediately following step a.:

a. In the housing bottom of the cup-shaped housing part, the following are incorporated:

A primary protection against internal overpressure in the form of an aperture closed by means of a metallic membrane, and a secondary protection against internal overpressure in the form of at least one groove on its inner side or its outer side.

Further features and advantages of the invention are apparent from the claims and from the following description of preferred examples of embodiments in conjunction with the drawings. The individual features may each be realized separately or in combination with one another.

The electrode-separator assembly illustrated in FIGS. 1A-D comprises a ribbon-shaped anode 105 (FIG. 1A) with a ribbon-shaped anode current collector 106 having a first longitudinal edge 106*a* and a second longitudinal edge parallel thereto. The anode current collector 106 is preferably a foil of copper or nickel. This comprises a strip-shaped main region loaded with a layer of negative electrode material 107, and a free edge strip 106*b* extending along its first longitudinal edge 106*a* which is not loaded with the electrode material 107. Further, the electrode-separator assembly comprises the ribbon-shaped cathode 108 (FIG. 1B) with the ribbon-shaped cathode current collector 109 having a first longitudinal edge 109*a* and a second longitudinal edge parallel thereto. The cathode current collector 109 is preferably an aluminum foil. It comprises a strip-shaped main region loaded with a layer of positive electrode material 110 and a free edge strip 109*b* extending along its first longitudinal edge 109*a*, which is not loaded with the electrode material 110. Both electrodes are shown individually in FIGS. 1A and B in an unwound state.

Figure 1D:
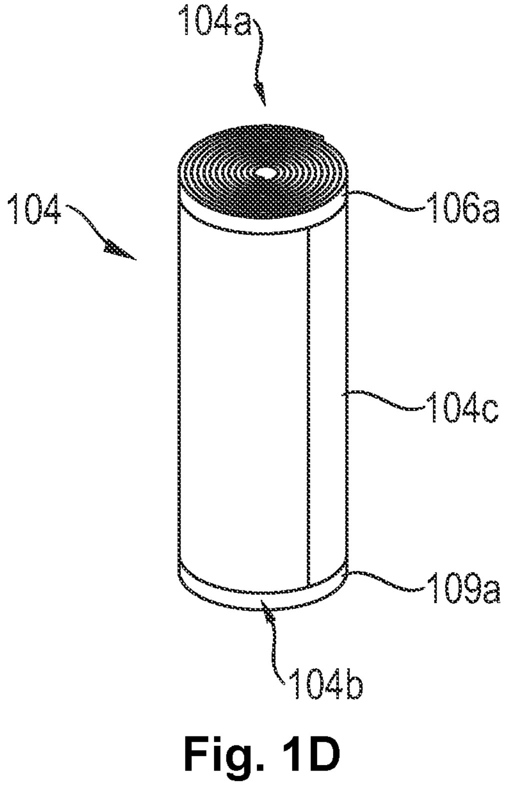

The anode 105 and cathode 108 are offset from each other within the electrode-separator assembly so that the first longitudinal edge 106*a* of the anode current collector 106 protrudes from the first terminal end face 104*a* and the first longitudinal edge 109*a* of the cathode current collector 109 protrudes from the second terminal end face 104*b* of the electrode-separator assembly 104. The offset arrangement can be seen in FIG. 1C. Also shown there are the two ribbon-shaped separators 116 and 117 that separate electrodes 105 and 108 in the winding. FIG. 1D shows the electrode-separator assembly in wound form, as it may be used in an energy storage element. The electrode edges 106*a*, 109*a* protruding from the end faces 104*a*, 104*b* are clearly visible. The outer winding shell 104*c* is formed by a plastic film.

Figure 2A:
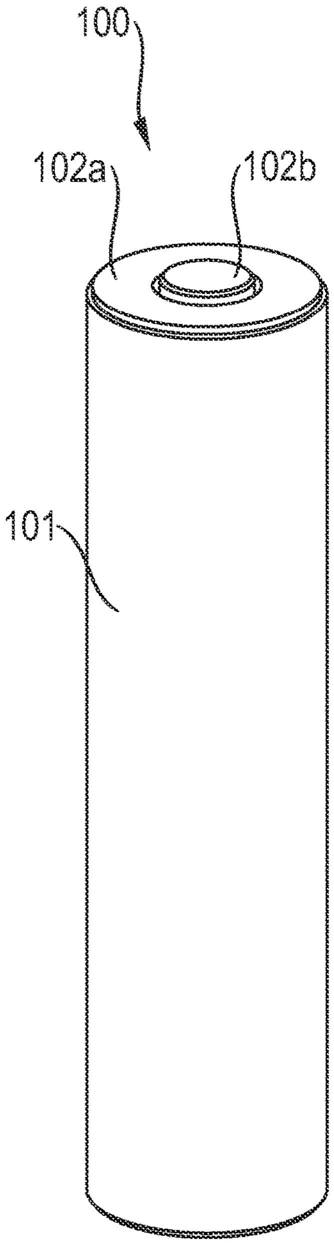
FIGS. 2A-C illustrate an embodiment of an energy storage cell from the outside and in a longitudinal section.
Figure 2B:
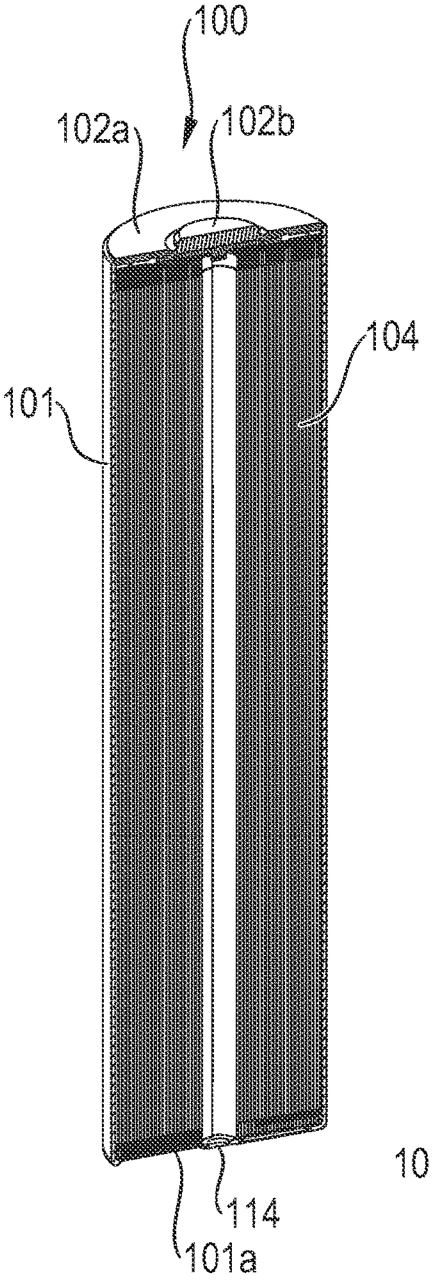
Figure 2C:
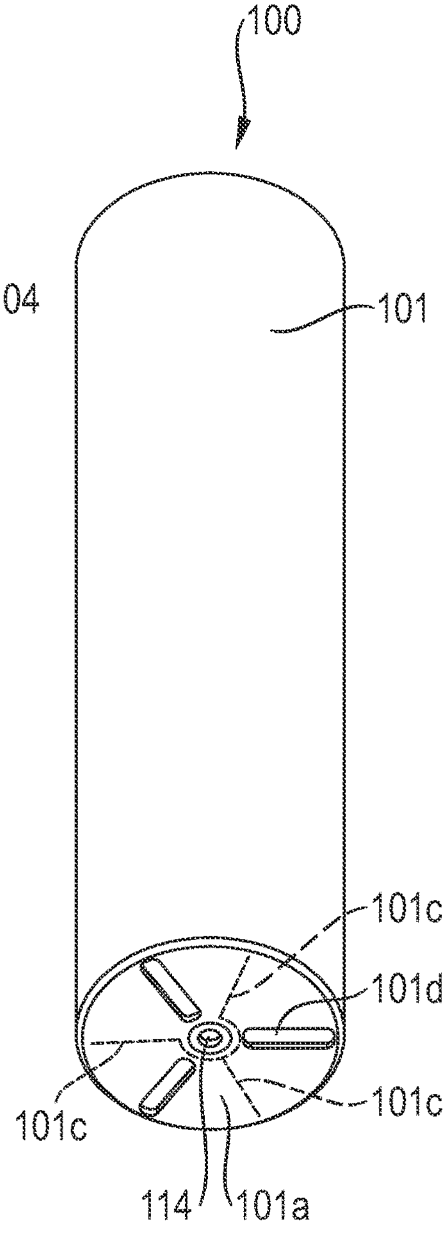

FIGS. 2A-C show a preferred embodiment of an energy storage cell in an oblique view from above (FIG. 2A), in a longitudinal section (FIG. 2B) and in an oblique view from below (FIG. 2C). The energy storage cell 100 is in the form of a cylindrical round cell. The housing of the energy storage cell 100 is formed by a cup-shaped housing part 101 and a lid assembly. In this regard, the lid assembly comprises a cover plate 102*a* which has the shape of an apertured plate and a terminal pole 102*b* in the center of the lid assembly.

As can be seen in the sectional view in FIG. 2B, inside the energy storage cell 100 is the wound electrode-separator assembly 104 formed by the wound electrode ribbons with separator ribbons in between.

In FIG. 2C, the underside of the energy storage cell 100 is shown, which is formed by the housing bottom 101*a*. In the housing bottom 101*a*, three weld embossments arranged in a star shape and in the form of beads 101*d*, which emerge outwardly as a depression and inwardly as an elongated elevation. The longitudinal edge of the respective current collector is seated on the inside of these beads 101*d*, and in the region from these beads the current collector is preferably welded directly to the housing bottom.

The material used for the housing bottom 101*a* and the entire cup-shaped housing part 101 is preferably aluminum.

In the present example, the housing bottom 101*a* incorporates two protection features. Firstly, there is an aperture in the center of the housing bottom 101*a* which is closed by a metallic membrane 114. In the event of an overpressure occurring due to a malfunction of the cell, a pressure equalization is brought about by means of this membrane 114, in which case the membrane is either blown open or blown off by the pressure. In this way, any gas that may have formed inside the cell can escape through the aperture in the housing bottom 101*a* (primary protection device).

In addition, a further protection function is provided in the housing bottom 101*a*, which is implemented by three grooves 101*c* arranged in a star shape. These grooves 101*c* represent weakenings in the structure of the housing bottom 101*a* and thus form predetermined breaking points in the event of excess pressure occurring inside the cell (secondary protection). In this example embodiment, the grooves are located on the inner side of the housing bottom 101*a* and are therefore shown as dashed lines in FIG. 2C. In particular, the grooves 101*c* may be implemented as three scribe lines. Furthermore, the star-shaped arrangement of the scribe lines is further formed by a part-circular connection of the scribe lines or the grooves 101*c*. At a correspondingly high overpressure, the housing bottom 101*a* tears open along the grooves 101*c* and the part-circular connection of these grooves, so that an outlet opening with a comparatively large cross-section is formed, via which any gas formed in the interior of the housing can escape quickly.

Figure 3A:
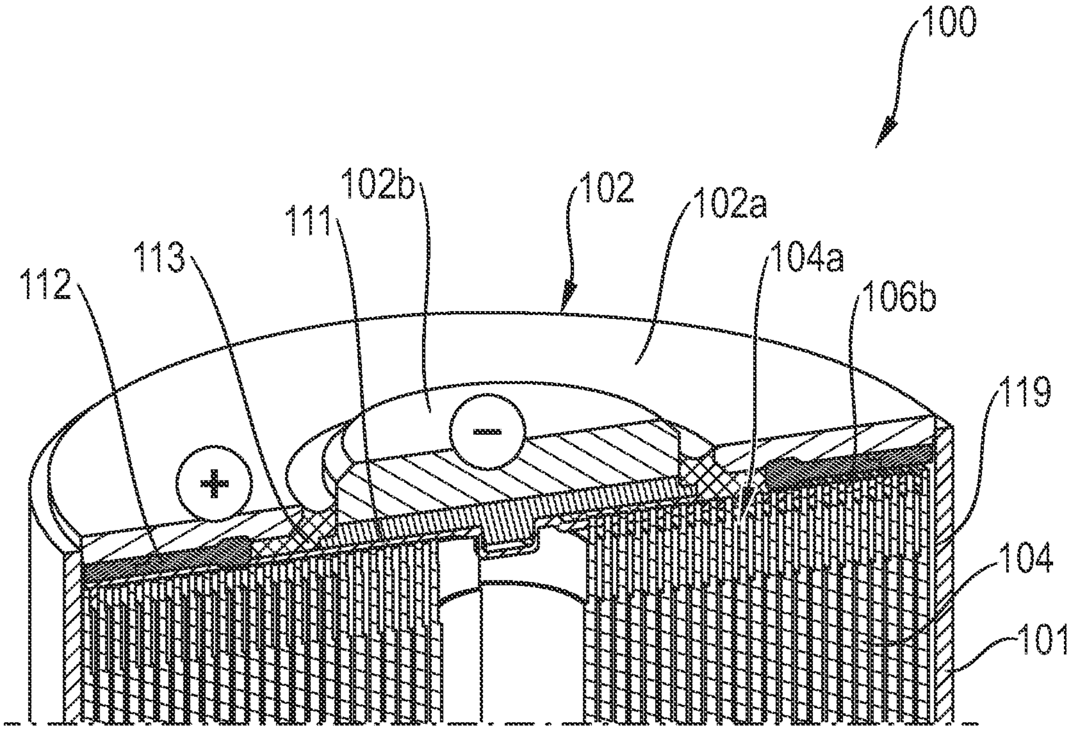
FIGS. 3A and B provide detailed illustrations of the upper and lower end face regions of an embodiment of an energy storage cell in a longitudinal section.

FIGS. 3A,B show an enlarged view of the end face regions of the energy storage cell 100. From FIG. 3A, details of the end face with the lid assembly 102 are apparent. The lid assembly 102 comprises the cover plate 102*a* having a central aperture and having the terminal pole 102*b* disposed in the center of the cover plate 102*a*. In this example embodiment, the terminal pole 102*b* forms the negative pole and the surrounding cover plate 102*a* forms the positive pole of the energy storage cell 100.

Below the terminal pole 102*b* is the contact sheet metal member 111, which is seated on the free edge strip 106*b* of the spirally arranged anode current collector of the negative electrode and is welded thereto. The contact sheet metal member 111 is electrically connected to the terminal pole 102*b* formed from two metallic components, in particular also by welding. With respect to the contact sheet metal member 111, the cover plate 102*a* is electrically insulated by an O-ring-shaped insulating washer 112. Furthermore, an electrically insulating potting compound 113 is located in a gap between the terminal pole 102*b* and the cover plate 102*a*.

Figure 3B:
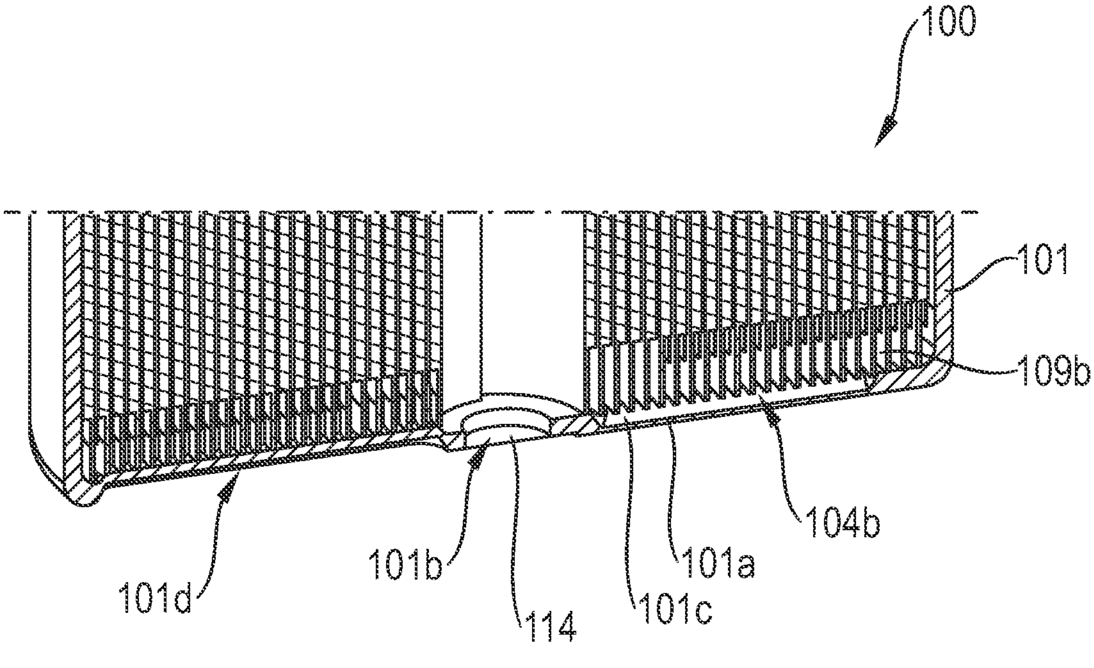

FIG. 3B shows details of the opposite end face of the energy storage cell 100, which is comprised by the housing bottom 101*a*. The free edge strip 109*b* of the cathode current collector is electrically connected, in particular welded, directly to the housing bottom 101*a* on this end face of the energy storage cell 100. Via the jacket of the cup-shaped housing part 101, electrical contact exists with the metallic cover plate 102*a* on the opposite end face, so that the positive potential of the cell can also be tapped on the upper end face of the energy storage cell 100.

The lower end face of the energy storage cell 100 shown in FIG. 3B shows the preferred protection functions of the cell against overpressure. The primary protection is formed by the metallic membrane 114 closing a central circular aperture 101*b* in the housing bottom 101*a*. The secondary protection is formed by the grooves 101*c*, one of the three star-shaped arranged grooves 101*c* being visible in section in this embodiment. The grooves 101*c*, which are located on the inside of the housing bottom 101*a*, provide a defined weakening structure of the housing bottom, so that when a relatively high overpressure is generated inside the cell, these structures can open and gas can escape.

The preferred design of the energy storage cell 100 illustrated with reference to FIG. 3 permits a reduced number of parts in the upper region of the energy storage cell (FIG. 3A), the negative and positive terminals of the cell being arranged in this upper region. In particular, this design eliminates the need for additional arresters due to the one-piece fabrication of the terminal pole 102*b*.

Direct contacting of the longitudinal edge of one of the electrode ribbons on the side of the housing bottom (subfigure 3B) also serves to make the cell particularly compact, so that no dead volumes are required for the various functions of the cell.

Direct contacting of the longitudinal edges of the electrode ribbons also improves heat dissipation and reduces internal resistance.

In addition, the design of this cell also generally allows for the formation of longer windings and thus greater energy density in the resulting energy storage cell.

In this embodiment, the upper end face of the energy storage cell 100 is maximally compact. In the event of any gases arising inside the cell which lead to an increase in pressure, these gases are inevitably conducted into the lower region of the cell, in which the safety functions for pressure equalization are arranged. Overall, such a cell therefore has a very good safety level.

Figure 4A:
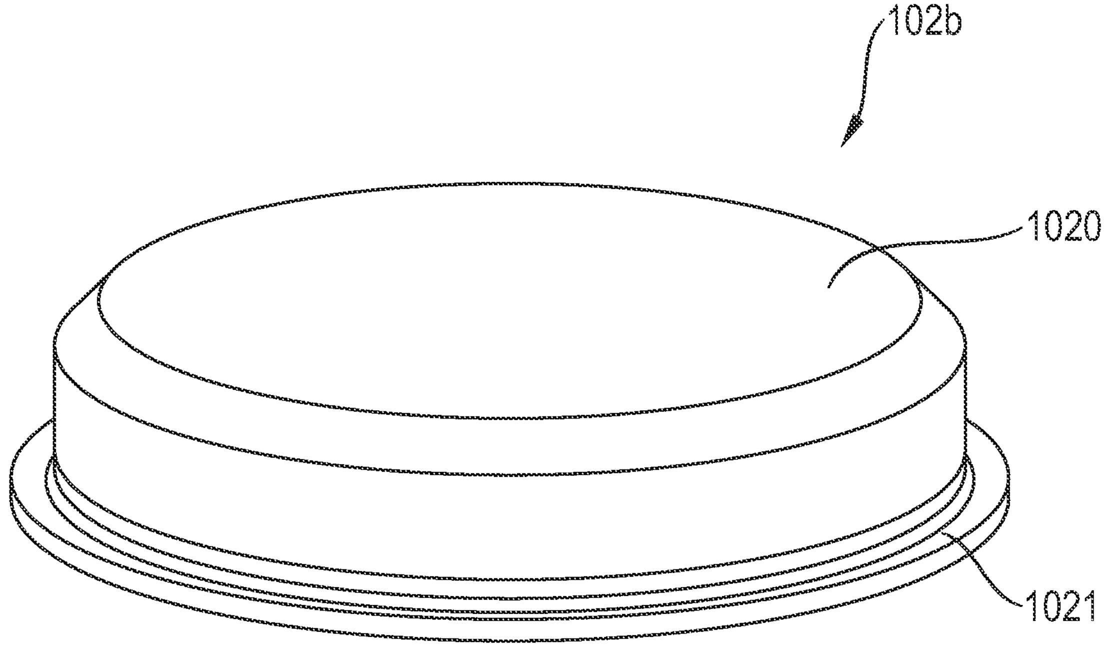
FIGS. 4A and B provide detailed illustrations of a terminal pole for a preferred embodiment of an energy storage cell in an oblique view from above and in a sectional view.
Figure 4B:
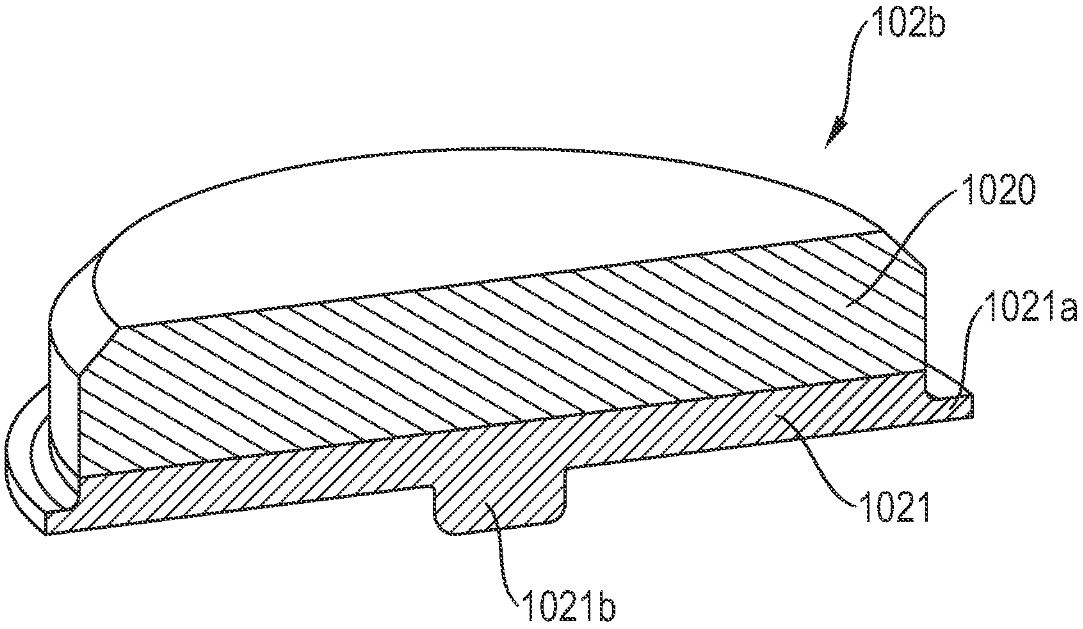

FIG. 4A,B shows a detailed view of the terminal pole 102*b* in an oblique view from above (FIG. 4A) and in a sectional view (FIG. 4B). In this preferred embodiment, the terminal pole 102*b* is composed of two metallic components. The top region (pole top) 1020 is preferably formed by aluminum and the lower region (pole bottom) 1021 is preferably formed by copper. The upper region 1020 has a beveled, circumferential upper edge. As shown in the sectional view according to FIG. 4B, the lower region 1021 includes an outer circumferential weld shoulder 1021*a* and a central downwardly projecting pin 1021*b*. The pin 1021*b* expediently engages a correspondingly provided depression in the center of the contact sheet metal member 111, thereby ensuring a good fit of the terminal pole 102*b*.

Such a terminal pole 102*b* can be formed, for example, from a bi-metal strip material with aluminum and copper. For example, a round blank is stamped out of the bi-metal for this purpose. The top region 1020 with the beveled edge and the base region 1021 with the central pin 2021*b* and the circumferential welding shoulder 1021*a* can be formed by cold forming.

Copper is particularly suitable for the base region 1021 of the terminal pole 102*b*, especially for those cases in which the terminal pole 102*b* is provided for contacting an anode current collector via the contact sheet metal member 111. The anode current collector also usually consists of copper, so that this material is also particularly suitable for the terminal pole. In this case, the contact sheet metal member 111 also preferably consists of copper.

The formation of the upper part 1020 of the terminal pole 102*b* from aluminum has the particular advantage that in this case the entire housing of the energy storage cell can be formed from aluminum, since generally the cup-shaped housing part 101 also consists of aluminum. Also, the cathode current collector, which may be electrically contacted with the housing bottom 101*a*, often consists of aluminum. Of course, if the energy storage cell 100 is constructed with reversed polarity, it is also possible that the metallic materials for the housing and/or the terminal pole are selected differently.

Figure 5A:
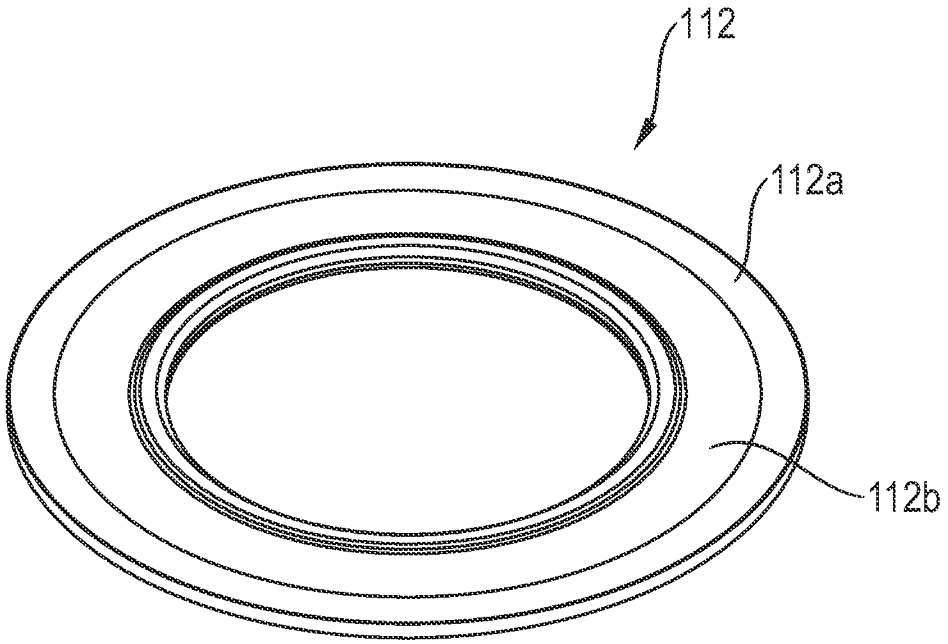
FIGS. 5A and B provide detailed illustrations of an insulating washer for a preferred embodiment of an energy storage cell in an oblique view from above and in a sectional view.
Figure 5B:
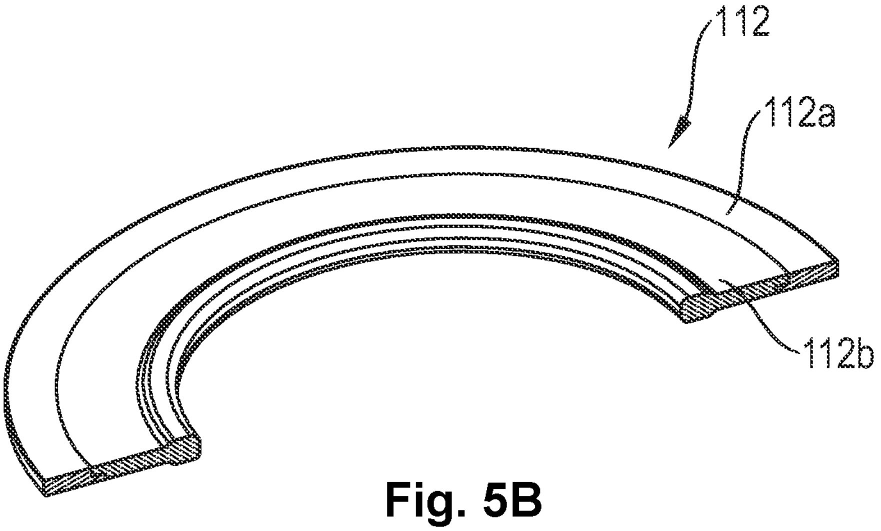

FIGS. 5A,B show the O-ring-shaped insulating washer 112 in a complete view obliquely from above (FIG. 5A) and in a cutaway view (FIG. 5B). In one aspect, the insulating washer 112 has the function of electrically insulating the cover plate 102*a*, which preferably has a positive polarity, from the components of the energy storage cell 100 having a negative polarity. In addition, the insulating washer 112 also provides a liquid-tight and air-tight seal for the housing.

In the preferred example of the insulating washer 112 shown here, the insulating washer is made of two different materials. The outer region 112*a* of the insulating washer 112 is preferably formed from a particularly rigid plastic material, for example PBT (polybutylene terephthalate). The inner region 112*b* is preferably formed of a somewhat more flexible and, more importantly, a particularly heat-resistant plastic material, for example PET (polyethylene terephthalate). The outer region 112*a* thus provides particular mechanical stability. The inner region 112*b* provides flexibility and is particularly resistant to the potting compound 13 to be applied hot during assembly of the energy storage cell.

With particular advantage, the inner circumference of the O-ring shaped insulating washer 112 has a circumferential thickening, which further supports the stability of the components in the end face region of the assembled energy storage cell.

During assembly of the energy storage cell, insertion of the insulating washer 112 in the lid area of the cell initially achieves temporary sealing of the cell until the subsequently applied potting compound 113 has cured to completely seal the cell. Furthermore, the special shape of the insulating washer 112 permits axial support of the wound electrode-separator assembly 104, for example during testing of the cell. Furthermore, if the cell is deformed laterally, the shape of the insulating washer 112 provides space for any deformation of the contact sheet metal member 111 that may occur. Finally, the shape of the insulating washer 112 makes it possible to reduce the volume of the potting compound 113 and the amount of air bubbles that may be trapped during potting when the energy storage cell is assembled.

As a possible alternative to such an insulating washer, for example, an insulating sealing bead comparable to a silicone bead can be metered on. This can also ensure a tight seal. In contrast, however, the insulating washer 112, in particular in the embodiment illustrated here, offers the various advantages mentioned.

Figure 6A:
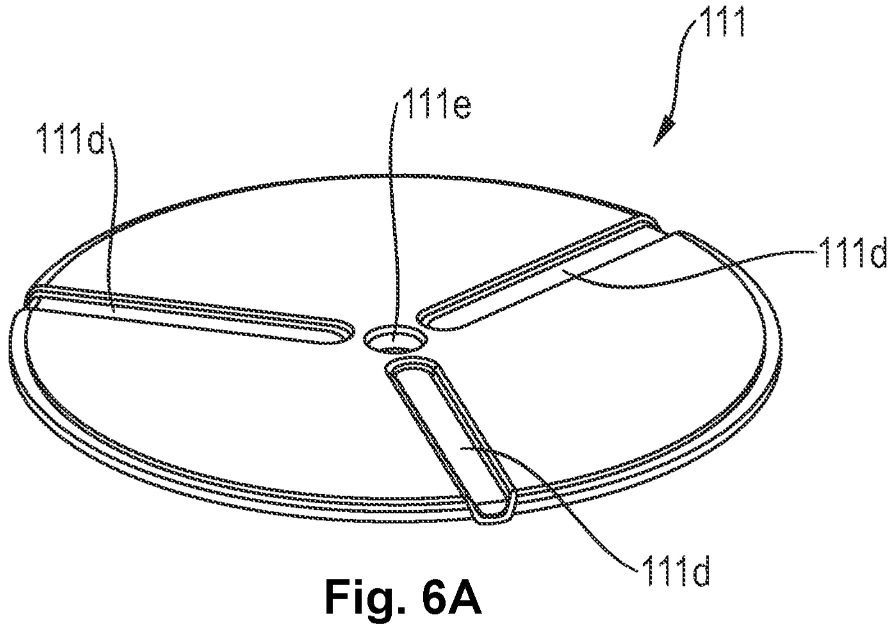
FIGS. 6A and B provide detailed illustrations of a contact sheet metal member for a preferred embodiment of an energy storage cell in an oblique view from above and in a sectional view oblique from below.
Figure 6B:
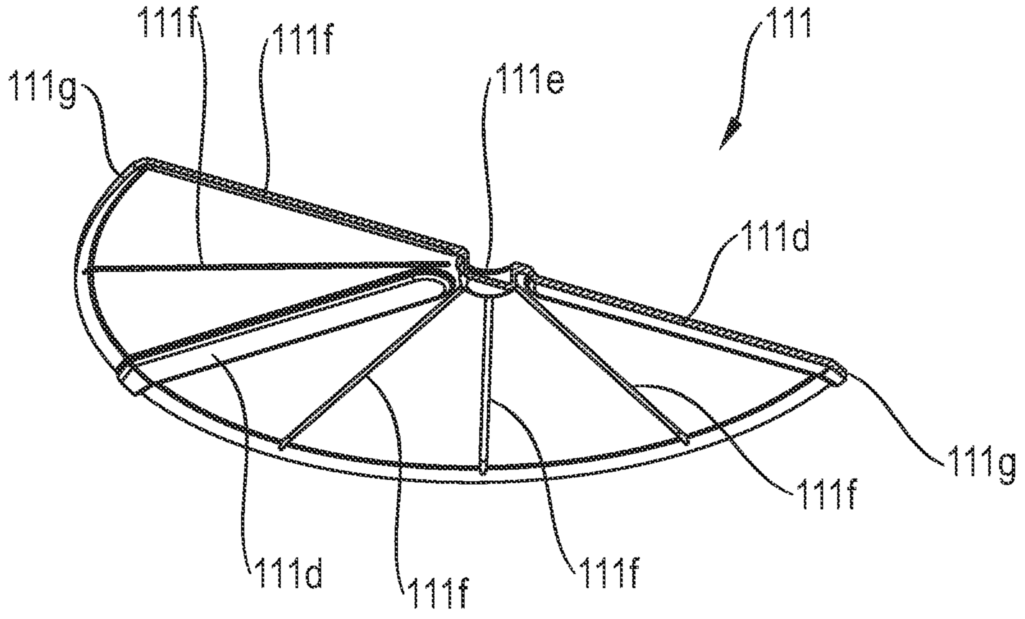

FIG. 6A,B shows a preferred embodiment of the contact sheet metal member 111, which is provided for contacting the free edge of the current collector of the respective electrode in the upper region of the energy storage cell. FIG. 6A shows a top view of the disk-shaped contact sheet metal member 111. FIG. 6B shows a section through the contact sheet metal member 111 in a view from below, i.e., on the side of the contact sheet metal member facing the electrode-separator assembly inside the energy storage cell.

Comparable to the beads 101*d* of the housing bottom 101*a*, the contact sheet metal member 111 also has three beads 111*d* arranged in a star shape, which appear outwardly (FIG. 6A) as a depression and inwardly (FIG. 6B) as an elongated elevation. The beads 111*d* can be stamped in, for example, and have a depth of 0.25 mm, for example. In the assembled state of the cell, the beads 111*d* are in contact with the respective longitudinal edge of an electrode ribbon of the electrode-separator assembly to be contacted thereover. The contact sheet metal member 111 is preferably welded to the respective longitudinal edge of the electrode ribbon via the beads 111*d*.

A depression 111*e* is located in the center of the contact sheet metal member 111. The depression 111*e* serves to receive the terminal pole 102*b*, in that the central pin 1021*b* of the terminal pole 102*b* engages in the depression 111*e*. In this way, the terminal pole 102*b* can be positioned and fixed on the contact sheet metal member 111 in a simple manner, so that welding of the terminal pole 102*b* is possible without any problems.

Furthermore, in the preferred embodiment of the contact sheet metal member 111 shown here, further star-shaped narrow depressions 111*f* are provided which are located on the inwardly directed side of the contact sheet metal member 111. In this example embodiment, a total of nine of these depressions 111*f* are provided as star-shaped narrow grooves. The grooves may have a depth of 0.1 mm, for example. The depressions 111*f* grooves serve to improve the distribution of the electrolyte within the cell.

Furthermore, in this preferred embodiment, the contact sheet metal member 111 has an embossed circumferential edge 111g, which is arranged as a predetermined bend point, in particular with the ridge facing downward. This predetermined buckling point facilitates assembly of the housing of the energy storage cell.

In preferred embodiments, the contact sheet metal member 111 is made of copper sheet, for example a copper sheet with a material thickness of 0.3 mm. Copper is particularly advantageous in those cases in which the contact sheet metal member is in contact with the longitudinal edge of the anode current collector, which is also preferably formed from copper.

Figure 7:
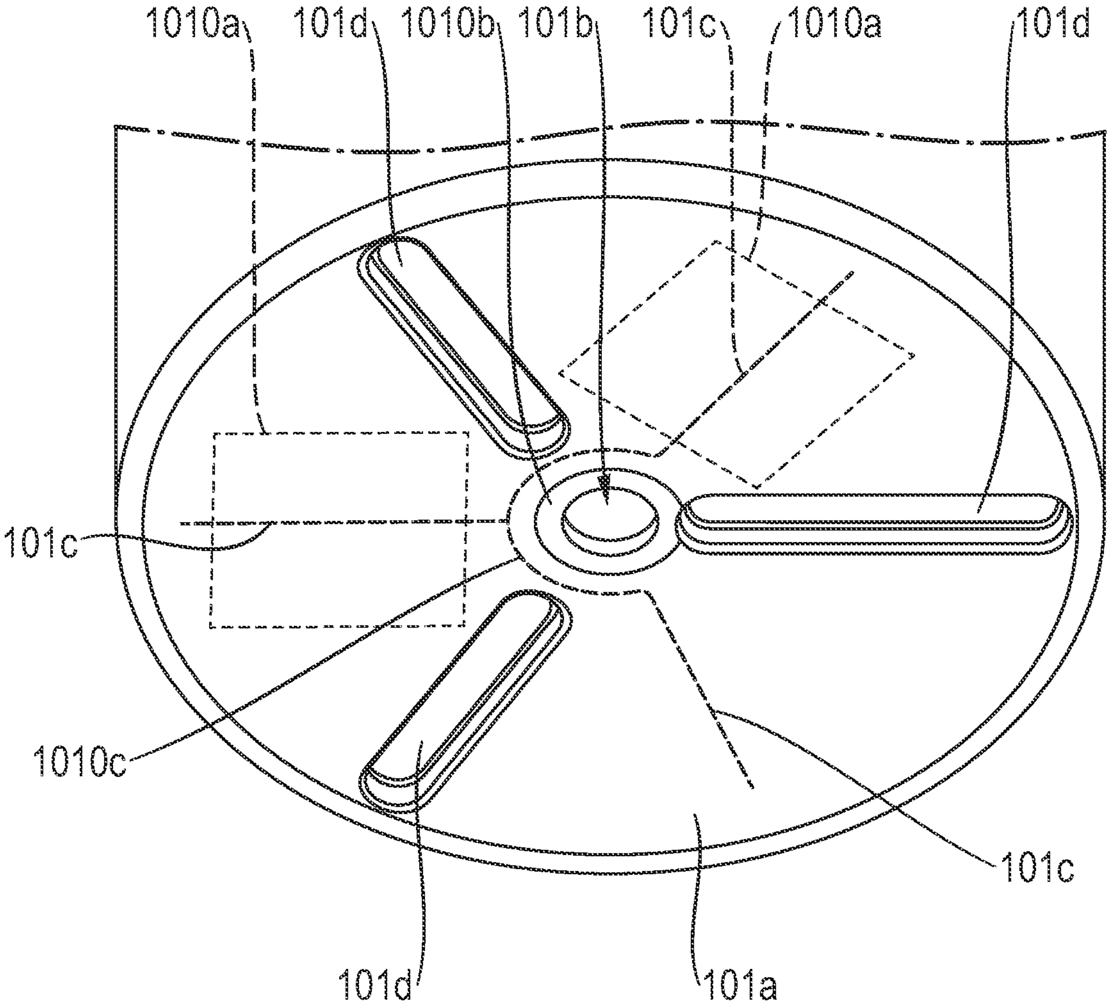
FIG. 7 provides a detailed illustration of the housing bottom of a preferred embodiment of an energy storage cell.

FIG. 7 shows a detailed view of the housing bottom 101*a* of the energy storage cell with the inwardly projecting beads 101*d* arranged in a star shape, which are formed in particular as welding embossments for contacting the wound electrode-separator assembly. The star-shaped arrangement with three beads 101*d* is particularly advantageous for the assembly of the cell, especially due to its rotational symmetry.

The central aperture 101*b* in the housing bottom 101*a* is covered by a metallic membrane 114 and serves as primary protection for the cell in the event of an overpressure occurring. In this context, it is particularly intended that the aperture 101*b* is first used for filling the cell with electrolyte during production of the cell before the aperture 101*b* is closed with the metallic membrane 114.

A circumferential depression 1010*b* surrounding the central aperture 101*b* is preferably provided for receiving the metallic membrane 114 for closing the central aperture 101*b*.

Furthermore, in this embodiment, three star-shaped weakening structures are provided in the form of the inwardly open grooves 101*c*, which are connected by a pitch-circle-shaped connecting line 1010*c*. These weakening structures 101*c* and 1010*c* serve as secondary protection against an internal overpressure. As an alternative to attaching the weakening structures from the inside of the housing bottom, such weakening structures, for example scribe lines, may also be attached from the outside.

Externally on the housing bottom 101*a*, there may further be provided one or more inscription panels 1010*a* that may be used for affixing various written information.

Figure 9A:
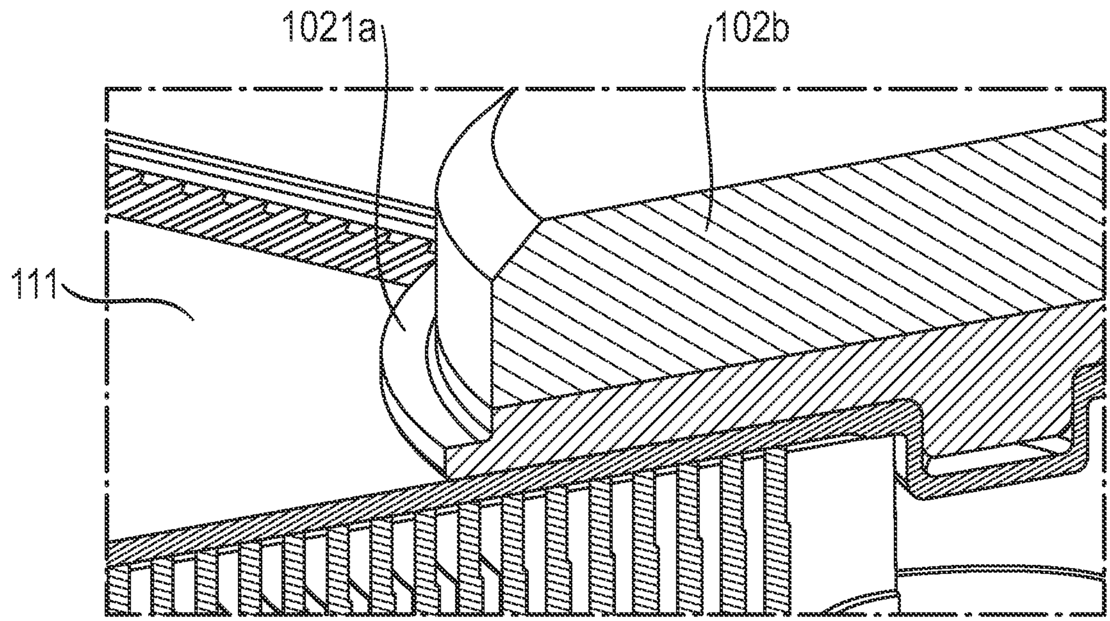
FIGS. 9A and B provide detailed illustrations from the upper end face region of a preferred embodiment of an energy storage cell to illustrate a production process for the energy storage cell.
Figure 9B:
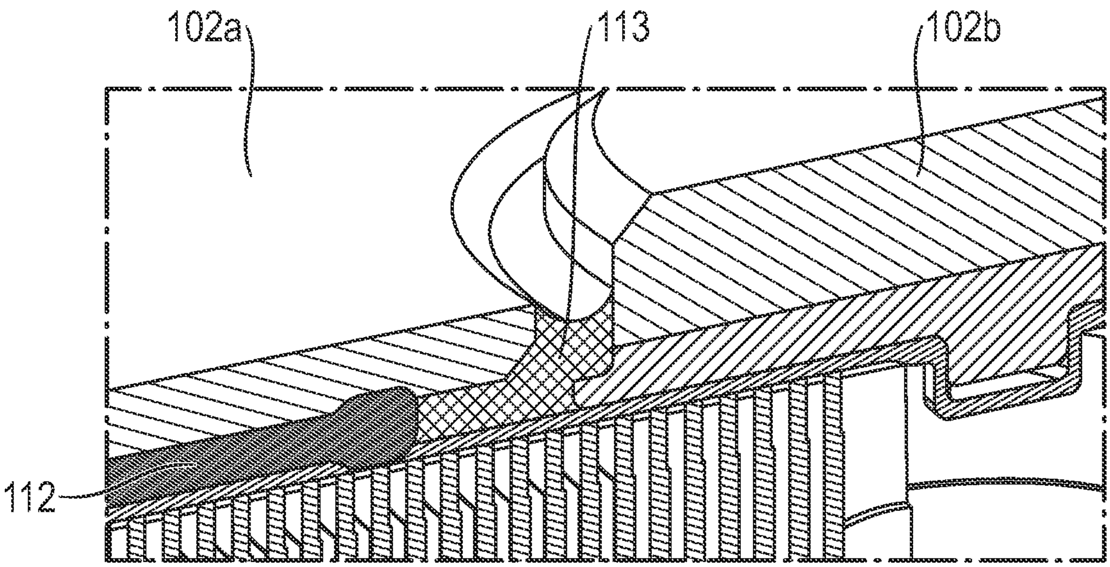
Figure 10:
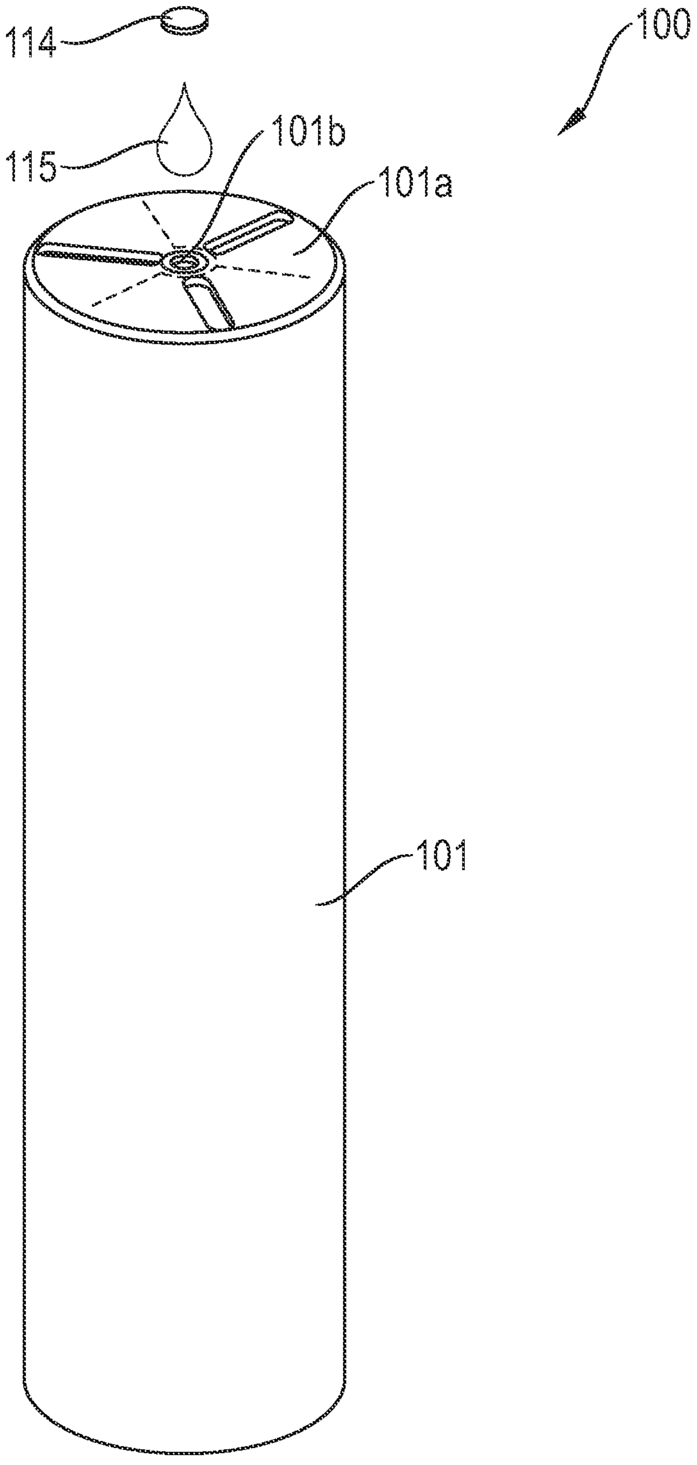
FIG. 10 provides an llustration of a preferred embodiment of an energy storage cell obliquely from above the housing bottom to illustrate a production process for the energy storage cell.

The following FIGS. 8 to 10 illustrate various details in connection with the manufacture of the energy storage cells.

Figure 8A:
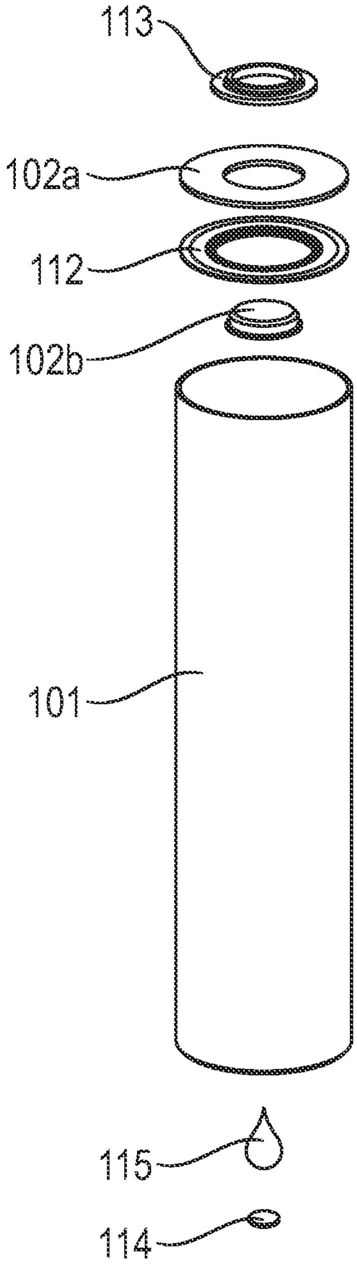
FIG. 8A-C provide illustrations of the various components of a preferred embodiment of an energy storage cell in exploded views.
Figure 8B:
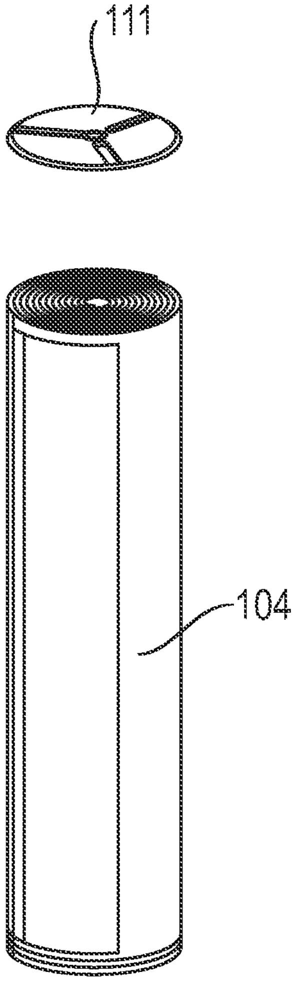
Figure 8C:
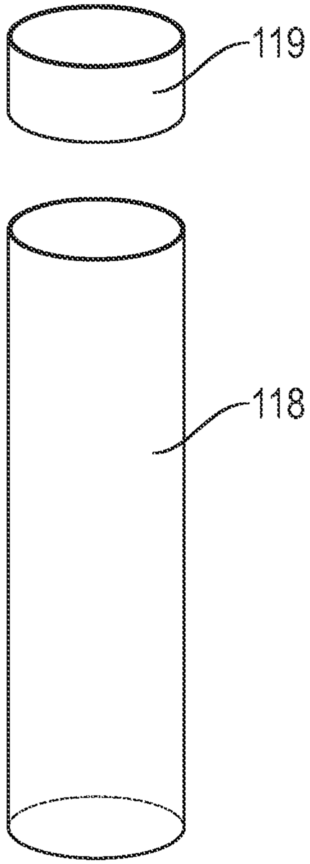

FIGS. 8A-C show exploded views of the various components of a preferred embodiment of an energy storage cell. FIG. 8A shows the components of the housing with the housing cup 101, the terminal 102*b*, the O-ring-shaped insulating washer 112, the cover plate 102 with the central recess in which the terminal 102*b* engages, and the potting compound 113. Below the housing cup 101, the closure for the energy storage cell is shown in the form of the metallic membrane 114, this closure being applied after the assembled cell has been filled with the electrolyte 115 schematically indicated here.

FIG. 8B shows the electrode-separator assembly in the for of a winding 104 and the contact sheet metal member 111 to be attached to it. The wound electrode-separator assembly 104 can be produced in a manner known per se by winding the electrode ribbons and the separators, in particular on a winding machine. To complete the winding form, in a preferred manner the outermost winding turn can be bent inwardly, for example by 30° to 45°, using a conical pressure piece, so that the winding form is stabilized. An adhesive tape 118 (FIG. 8C), for example made of polypropylene, is then preferably applied to the outer circumferential surface of the winding, which, in addition to its stabilizing function, may also perform an electrically insulating function in the cell. After this stabilization of the winding-shaped electrode-separator assembly 104, the disk-shaped contact sheet metal member 111, which is formed of copper, for example, can be placed loosely on the upper end face of the winding and fixed with a particularly stable adhesive tape 119 made of polyimide, for example. A tape made of Kapton® with a thickness of 50 μm can be used for this purpose, for example.

The electrode-separator assembly 104 with the attached contact sheet metal member 111 is then inserted into the cup-shaped housing part 101. After alignment of the beads in the housing bottom and in the contact sheet metal member, which may be camera-assisted, the assembly can be pressed with the aid of suitable pressing tools and laser-welded simultaneously or sequentially from above and below to contact the longitudinal edges of the electrode ribbons with the respective beads. Subsequently, the terminal pole 102*b* can be placed on the contact sheet metal member 111 and welded on.

FIG. 9A,B shows details of the fabrication of the lid assembly of the cell. FIG. 9A shows a detailed view of the welding of the contact sheet metal member 102*b* onto the contact sheet metal member 111, where the laser can be applied obliquely or vertically, particularly in the region from the circumferential welding shoulder 1021*a* of the contact sheet metal member 102*b*. FIG. 9B shows how thereafter the insulating washer 112 can be inserted and pressed to the correct height before the cover plate 102*a* is placed and welded from obliquely, vertically or horizontally to the cup-shaped housing part not shown here. Now, if necessary, the terminal pole 102*b* can be pressed to the correct height with respect to the cell shoulder formed by the upper side of the cover plate 102*a*. The gap provided for this purpose may be, for example, 1 mm between the top of the terminal pole 102*b* and the top of the cover plate 102*a*. The gap between the cover plate 102*a* and the terminal pole 102*b* is filled with a potting compound 113, so as to seal this part of the energy storage cell in an airtight and liquid-tight manner.

The energy storage cell can then be transferred to an oven to set the potting compound 113 and bake out the residual moisture of the wound electrode-separator assembly.

FIG. 10 illustrates the final filling with electrolyte 115, which is filled from the underside of the energy storage cell 100 (in this embodiment at the top) through the aperture 101*b* in the housing bottom 101*a*. Finally, the metallic membrane 114 is applied as a closure on the opening in the housing bottom 101*a* or as a closure on the central aperture 101*b*. For this purpose, a vertical laser beam can be used, for example.

Figure 11A:
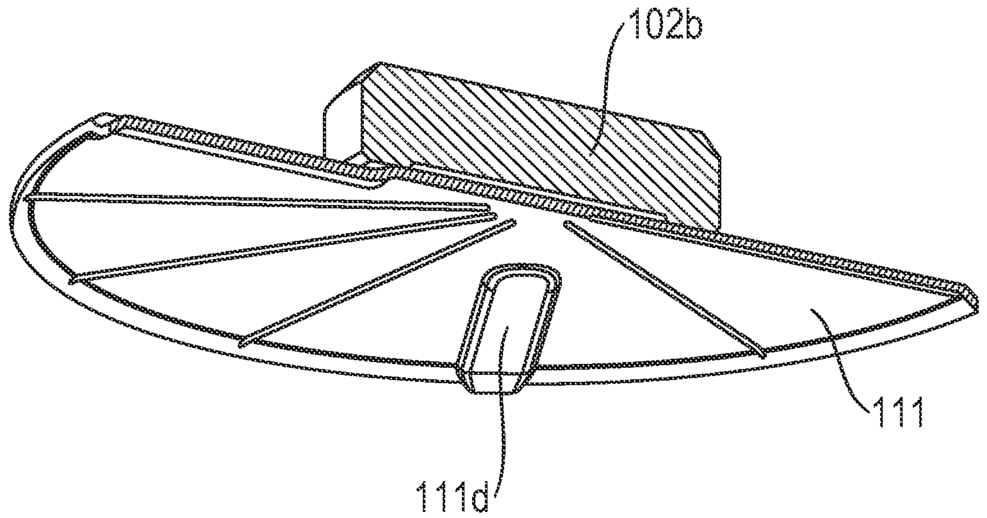
FIGS. 11A and B provide an alternative embodiment of a contact sheet metal member with terminal pole attached thereto and its installation in an embodiment of an energy storage cell in sectional views.
Figure 11B:
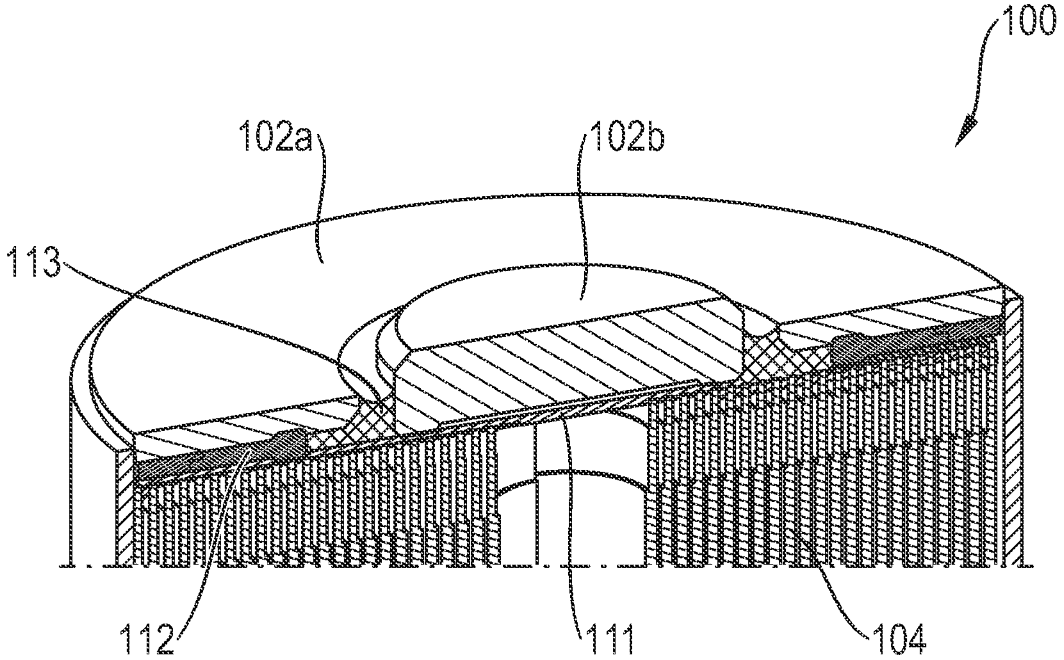

FIG. 11 illustrates an alternative way of mounting the lid assembly. FIG. 11A shows the contact sheet metal member 111 with terminal 102*b* attached thereto in a cross-sectional view obliquely from below. FIG. 11B shows the upper face portion of the cell in a longitudinal section.

In this alternative manufacturing process, the terminal pole 102*b* is welded to the contact sheet metal member 111 in advance. Friction welding or friction stir welding can be used for this purpose.

In the embodiment of the contact sheet metal member 111 in this embodiment, the star-shaped beads 111*d* of the contact sheet metal member 111 can be shortened if necessary, since they are covered by the terminal pole 102*b* during the subsequent welding of the electrode-separator assembly. Overall, therefore, somewhat less welding area is available for contacting the longitudinal edge of the respective electrode ribbon with the contact sheet metal member 111. However, this embodiment may offer advantages for assembly.

Since it may be easier to attach the terminal 102*b* directly to the contact sheet metal member 111 outside of the housing cup assembly, a central depression in the contact sheet metal member and a corresponding pin at the terminal 102*b* may not be required, if necessary.

Further assembly of the energy storage cell with the terminal pole 102*b* already welded directly onto the contact plate 111 does not differ in principle from the previously described manufacturing process for the energy storage cell 100.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An energy storage element, comprising:

an air- and liquid-tight sealed housing comprising:

a metallic, cup-shaped housing part that comprises a housing bottom, a circumferential side wall, and a terminal opening, and a lid assembly which closes the terminal opening of the cup-shaped housing part, the lid assembly including a metallic cover plate and a terminal pole which is passed through an aperture in the cover plate and is electrically insulated from the cover plate;

an electrode-separator assembly disposed in the housing, the electrode-separator assembly comprising:

a first flat terminal end face and a second flat terminal end face, an anode having an anode current collector having a first edge, a second edge parallel thereto, a main region loaded with a layer of negative electrode material and a free edge strip extending along its first edge which is not loaded with the electrode material, and a cathode with a cathode current collector having a first edge, a second edge parallel thereto, a main region loaded with a layer of positive electrode material and a free edge strip extending along its first edge which is not loaded with the electrode material; and a contact sheet metal member directly seated on the first edge of the anode current collector or on the first edge of the cathode current collector, the contact sheet metal member being electrically connected to the terminal pole passing through the aperture in the cover plate, wherein the anode and the cathode are arranged within the electrode-separator assembly such that the first edge of the anode current collector protrudes from the first terminal end face and the first edge of the cathode current collector protrudes from the second terminal end face of the electrode-separator assembly, wherein the first edge of the cathode current collector or the anode current collector which is not in direct contact with the contact sheet metal member is electrically connected to the housing bottom, wherein the terminal pole sits directly on the contact sheet metal member and is connected to it by welding, and wherein the terminal pole is electrically insulated from the cover plate by a cured potting compound of an electrically insulating plastic material.

2. The energy storage element according to claim 1, wherein at least one of:

an annular gap is disposed between the cover plate and the contact sheet metal member, which is filled with the potting compound, and/or the annular gap is bounded radially outwardly by an O-ring-shaped insulating washer made of an electrically insulating plastic material.

3. The energy storage element according to claim 1, wherein at least one of:

the cup-shaped housing part is electrically connected to the cathode, the contact sheet metal member sits on the first edge of the anode current collector and is joined to it by welding, the cup-shaped housing part consists of aluminum or an aluminum alloy, the cover plate consists of aluminum or an aluminum alloy, and/or the contact sheet metal member is in direct contact with the terminal pole guided through the aperture in the cover plate and is preferably connected thereto by welding.

4. The energy storage element according to claim 1, wherein at least one of:

the cup-shaped housing part is electrically connected to the anode, the contact sheet metal member is seated on the first edge of the cathode current collector and is joined to it by welding, the cup-shaped housing part consists of copper or nickel or a copper or nickel alloy or steel or nickel-plated steel, the cover plate consists of copper or nickel or a copper or nickel alloy or steel or nickel-plated steel, and/or the contact sheet metal member is in direct contact with the terminal pole guided through the aperture in the cover plate and is connected thereto by welding.

5. The energy storage element according to claim 1, wherein at least one of:

the contact sheet metal member consists of nickel or copper or titanium or a nickel or copper or titanium alloy or stainless steel, the terminal pole is a bimetallic terminal pole and comprises a pole base part made of nickel or copper or titanium or a nickel or copper or titanium alloy or stainless steel and a pole top part made of aluminum or an aluminum alloy, the pole base part is welded to the contact sheet metal member, and/or the pole base part and the contact sheet metal member and the anode current collector consist of the same material.

6. The energy storage element according to claim 1, wherein at least one of:

the contact sheet metal member consists of aluminum or an aluminum alloy, the terminal pole consists of aluminum or an aluminum alloy, and/or the contact sheet metal member and the terminal pole and cathode current collector consist of the same material.

7. The energy storage element according to claim 1, wherein at least one of:

the contact sheet metal member has a uniform thickness in a region from 50 μm to 600 μm, the contact sheet metal member has two opposing flat sides and extends substantially in only one dimension, the contact sheet metal member is a disc or polygonal plate, the contact sheet metal member is dimensioned such that it covers at least 40% of the end face from which the edge of the current collector on which it rests protrudes, the contact sheet metal member has at least one bead which appears as an elongated depression on one flat side of the contact sheet metal member and as an elongated elevation on the opposite flat side, wherein the contact sheet metal member rests with the flat side which carries the elongated elevation on the first edge of the anode current collector or on the first edge of the cathode current collector, and/or the contact sheet metal member is welded to the first edge of the anode current collector or the first edge of the cathode current collector in the region of the bead.

8. The energy storage element according to claim 1, wherein:

the housing bottom of the cup-shaped housing part has a primary protection against internal overpressure in a form of an aperture which is closed by means of a metallic membrane, and the housing bottom of the cup-shaped housing part has a secondary protection against internal overpressure in a form of at least one groove on its inner side or its outer side.

9. The energy storage element according to claim 1, wherein the metallic membrane is fixed to the bottom of the cup-shaped housing part by welding.

10. The energy storage element according to claim 1, wherein at least one of:

the housing bottom has at least one bead which appears as an elongated depression on its outer side and as an elongated elevation on its inner side, wherein the first edge of the anode current collector or the first edge of the cathode current collector is seated on the inner side, the housing bottom is welded to the first edge of the anode current collector or the first edge of the cathode current collector in the region of the bead, the aperture is positioned in the center of the housing bottom, the at least one bead comprises a plurality of linear beads, in particular three beads, arranged in a star configuration around the aperture, the at least one groove comprises a plurality of linear partial sections arranged in a star configuration around the aperture, and/or the at least one groove comprises a partial section extending around the aperture and interconnecting the star-shaped linear partial sections.

11. The energy storage element according to claim 1, the lid assembly further comprising an insulating washer and the potting compound, wherein the insulating washer electrically insulates the cover plate from the contact sheet metal member.

12. The energy storage element according to claim 11, wherein the insulating washer comprises an aperture, wherein the terminal pole and the potting compound pass through the aperture of the insulating washer.

13. The energy storage element according to claim 11, wherein the insulating washer electrically insulates the cover plate from the contact sheet metal member in an axial direction, and wherein the potting compound electrically insulates the terminal pole from the cover plate in a radial direction.

14. The energy storage element according to claim 13, wherein the potting compound electrically insulates the cover plate from the contact sheet metal member in the axial direction.

15. The energy storage element according to claim 11, wherein the insulating washer is made of an electrically insulating plastic material.

* * * * *